(12) United States Patent
Kogawa et al.

(10) Patent No.: US 12,539,619 B2
(45) Date of Patent: Feb. 3, 2026

(54) WIRELESS DEVICE, CONTROL SYSTEM, WIRELESS TRANSMISSION METHOD, AND STORAGE MEDIUM

(71) Applicant: KABUSHIKI KAISHA TOSHIBA, Tokyo (JP)

(72) Inventors: Tsuyoshi Kogawa, Kawasaki Kanagawa (JP); Toshihisa Nabetani, Kawasaki Kanagawa (JP); Tomoya Tandai, Ota Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 550 days.

(21) Appl. No.: 17/691,427

(22) Filed: Mar. 10, 2022

(65) Prior Publication Data

US 2023/0080423 A1 Mar. 16, 2023

(30) Foreign Application Priority Data

Sep. 16, 2021 (JP) .................................. 2021-151521

(51) Int. Cl.
*B25J 13/00* (2006.01)
*B25J 13/08* (2006.01)
*G08C 17/02* (2006.01)

(52) U.S. Cl.
CPC ............. *B25J 13/006* (2013.01); *B25J 13/08* (2013.01); *G08C 17/02* (2013.01); *G05B 2219/39001* (2013.01)

(58) Field of Classification Search
CPC ......... B25J 13/006; B25J 13/08; G08C 17/02; G05B 2219/39001
See application file for complete search history.

(56) References Cited

U.S. PATENT DOCUMENTS

| | | | |
|---|---|---|---|
| 8,836,476 B2 * | 9/2014 | Campbell | H05B 47/185 340/5.64 |
| 9,527,478 B2 * | 12/2016 | Flick | G06F 7/00 |
| 10,491,290 B2 * | 11/2019 | Takaoki | G08C 17/02 |
| 10,894,320 B2 * | 1/2021 | Kurihara | B25J 9/161 |
| 12,097,607 B2 * | 9/2024 | Katou | B25J 13/006 |
| 2018/0236656 A1 * | 8/2018 | Kurihara | B25J 9/163 |
| 2018/0243917 A1 * | 8/2018 | Takemoto | B25J 13/06 |
| 2019/0230608 A1 | 7/2019 | Kunitachi | |
| 2020/0301410 A1 * | 9/2020 | Yamagaki | G05D 1/0022 |
| 2020/0322909 A1 * | 10/2020 | Rácz | H04W 56/004 |
| 2021/0016438 A1 * | 1/2021 | Pivac | G01S 17/42 |
| 2021/0029874 A1 * | 2/2021 | Robertsson | G05B 19/4155 |

FOREIGN PATENT DOCUMENTS

| | | | |
|---|---|---|---|
| JP | 2014068203 A | | 4/2014 |
| JP | 2015167268 A | | 9/2015 |
| JP | 2019129526 A | | 8/2019 |

* cited by examiner

*Primary Examiner* — Thomas D Alunkal
(74) *Attorney, Agent, or Firm* — Holtz, Holtz & Volek PC

(57) ABSTRACT

According to one embodiment, a wireless device comprises circuitry configured to generate a control signal of a control target, generate transfer necessity indicating whether transfer of the control signal is necessary or unnecessary, generate control information including the control signal and the transfer necessity, and transmit a wireless signal corresponding to the control information.

18 Claims, 26 Drawing Sheets

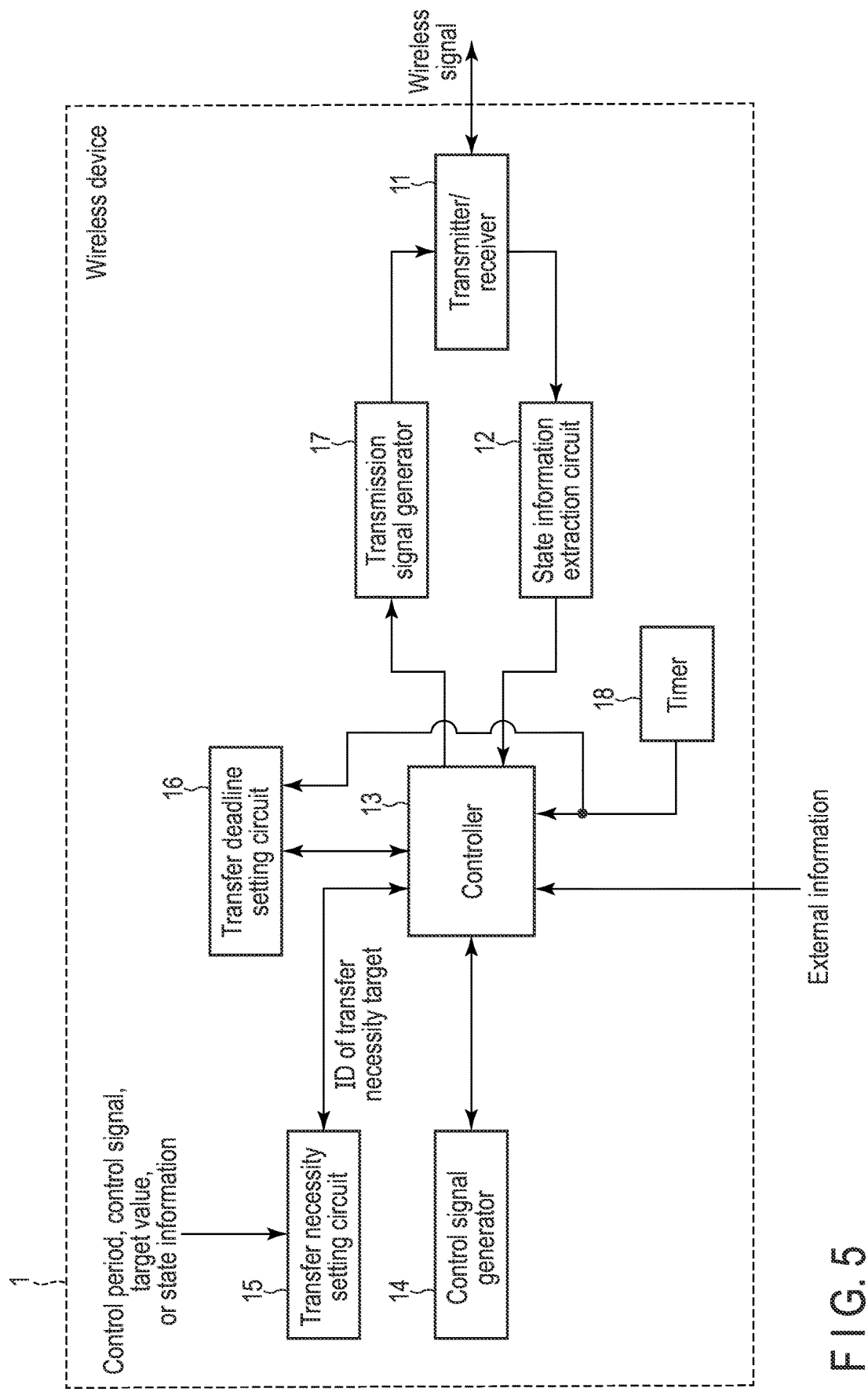
F I G. 5

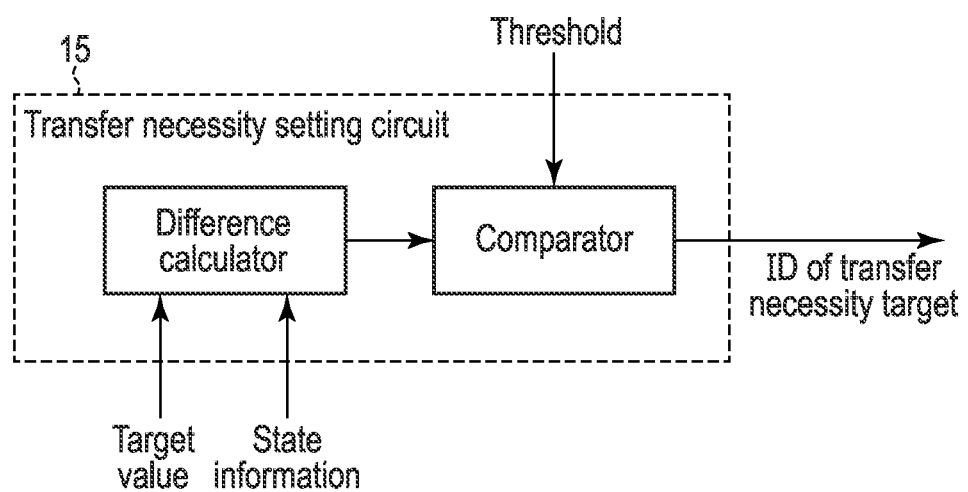
F I G. 6

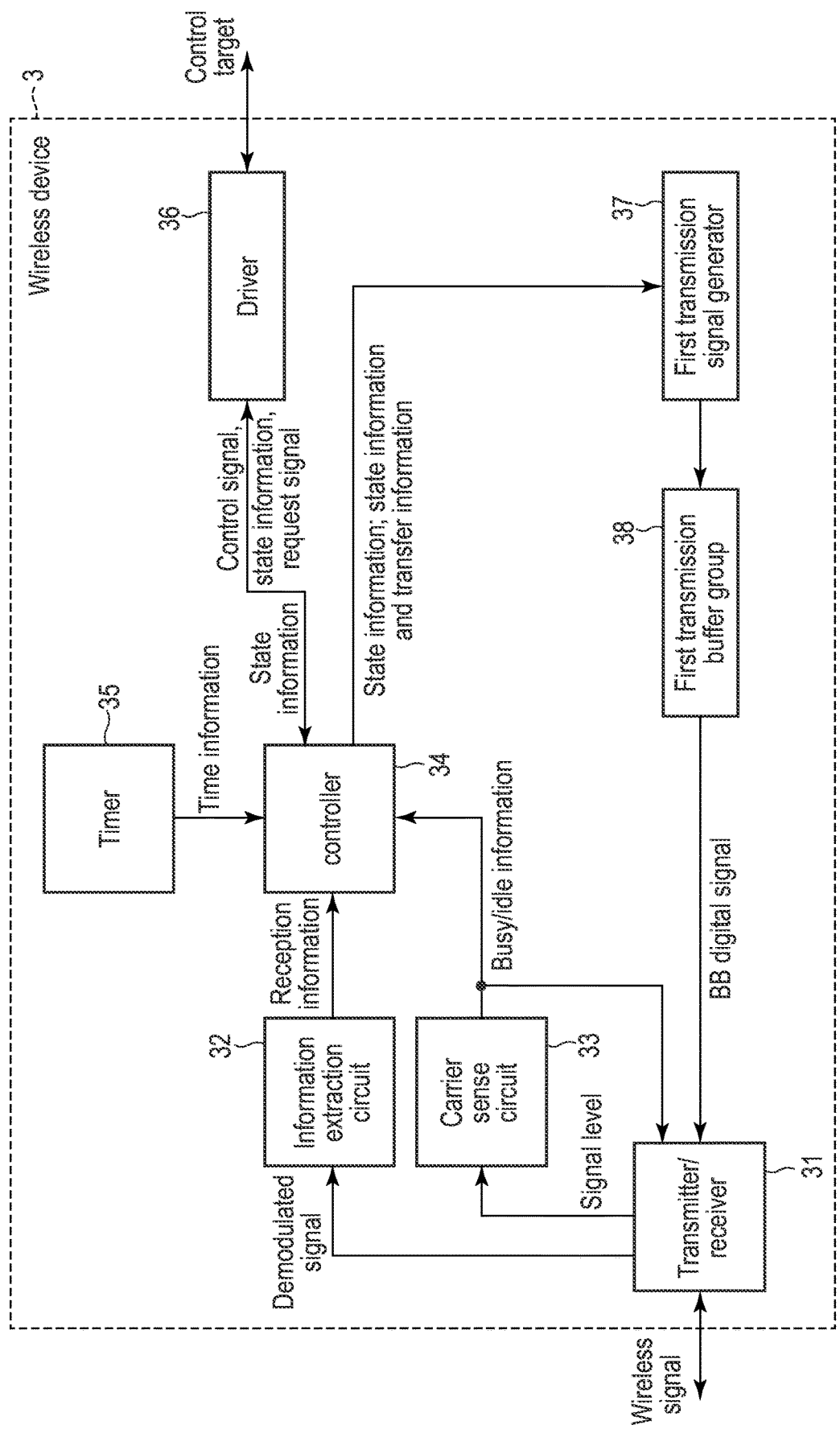
F I G. 8

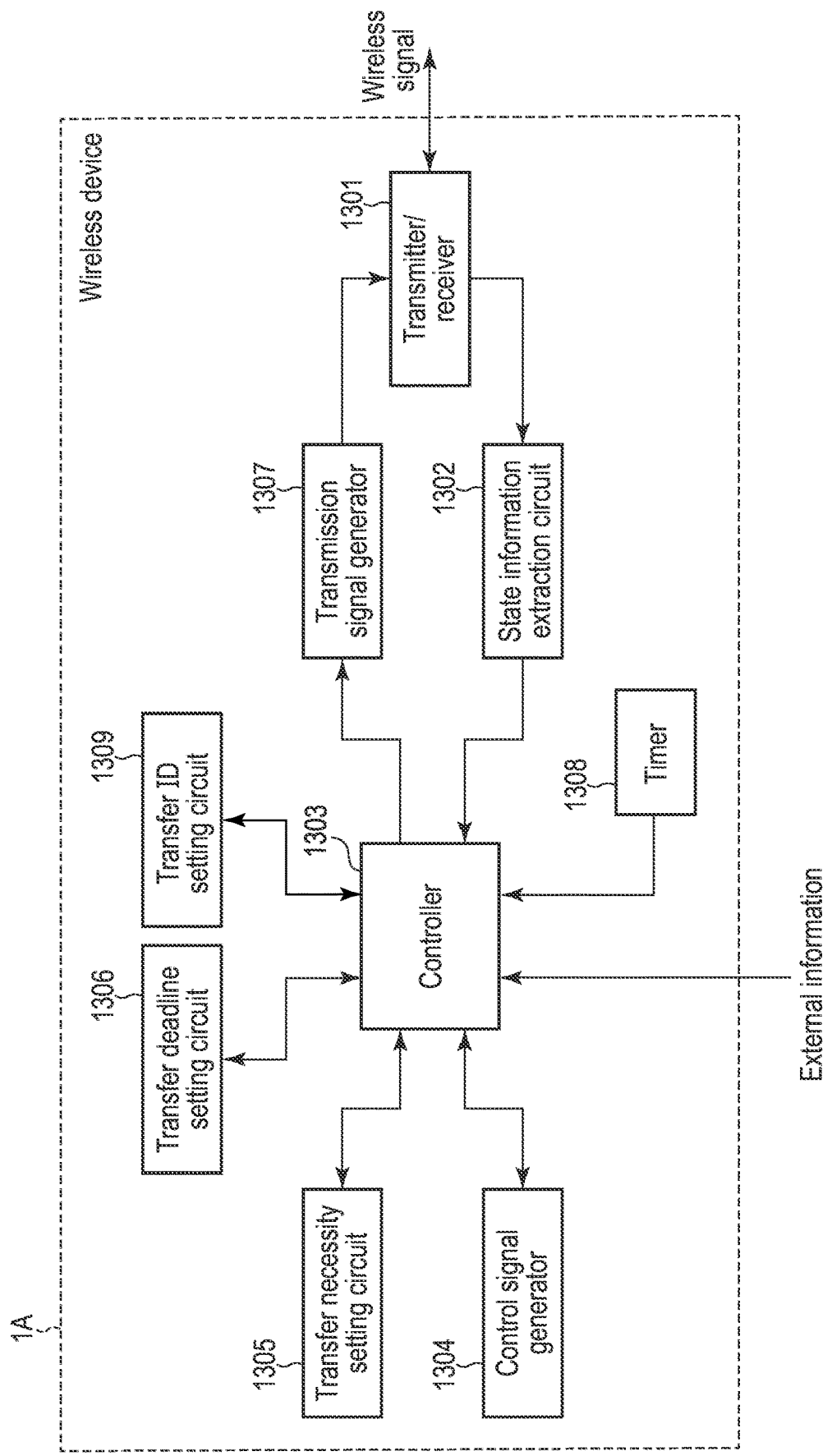
F I G. 10

|  | Wireless device 3A1 | Wireless device 3A2 | Wireless device 3A3 | Wireless device 3A4 | Wireless device 3A5 | Wireless device 3A6 |
|---|---|---|---|---|---|---|
| Wireless device 3A1 | | — | — | — | — | — |
| Wireless device 3A2 | 10 | | — | — | — | — |
| Wireless device 3A3 | 30 | 20 | | — | — | — |
| Wireless device 3A4 | 65 | 55 | 40 | | — | — |
| Wireless device 3A5 | 90 | 80 | 60 | 40 | | — |
| Wireless device 3A6 | 85 | 75 | 55 | 60 | 40 | |

FIG. 11

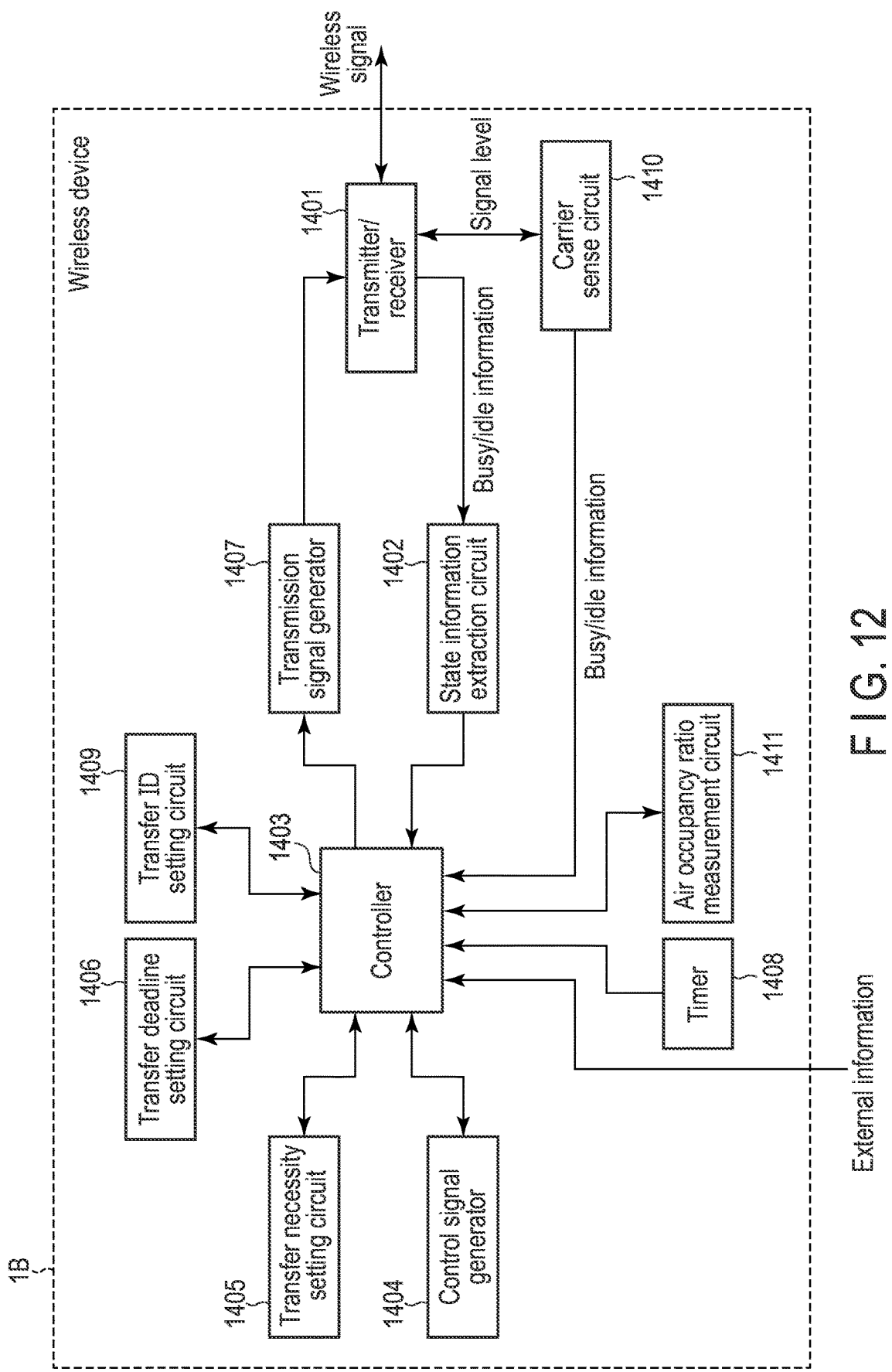
F I G. 12

| The number of transfer necessity targets | Air occupancy ratio | | | | |
|---|---|---|---|---|---|
| | Equal to or more than 0 and less than 0.5 | Equal to or more than 0.5 and less than 0.7 | Equal to or more than 0.7 and less than 0.8 | Equal to or more than 0.8 and less than 0.9 | Equal to or more than 0.9 |
| 1 | T | T | T/2 | T/4 | 0 |
| 2 | T | T | T/2 | 0 | 0 |
| 3 | T | T | T/2 | 0 | 0 |
| 4 | T | T/2 | 0 | 0 | 0 |
| 5 | T | T/2 | 0 | 0 | 0 |
| 6 | T | T/2 | 0 | 0 | 0 |

F I G. 13

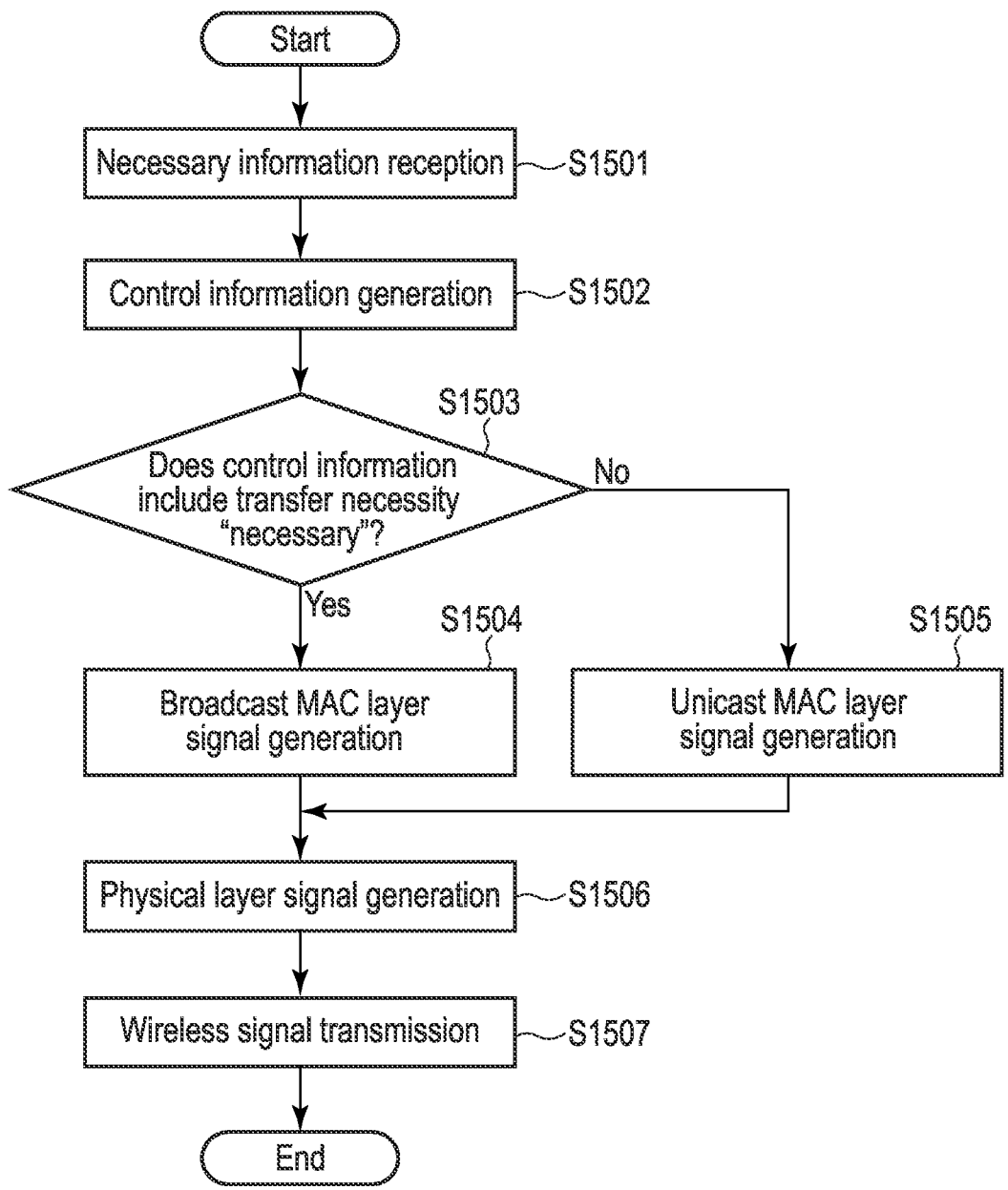
F I G. 15

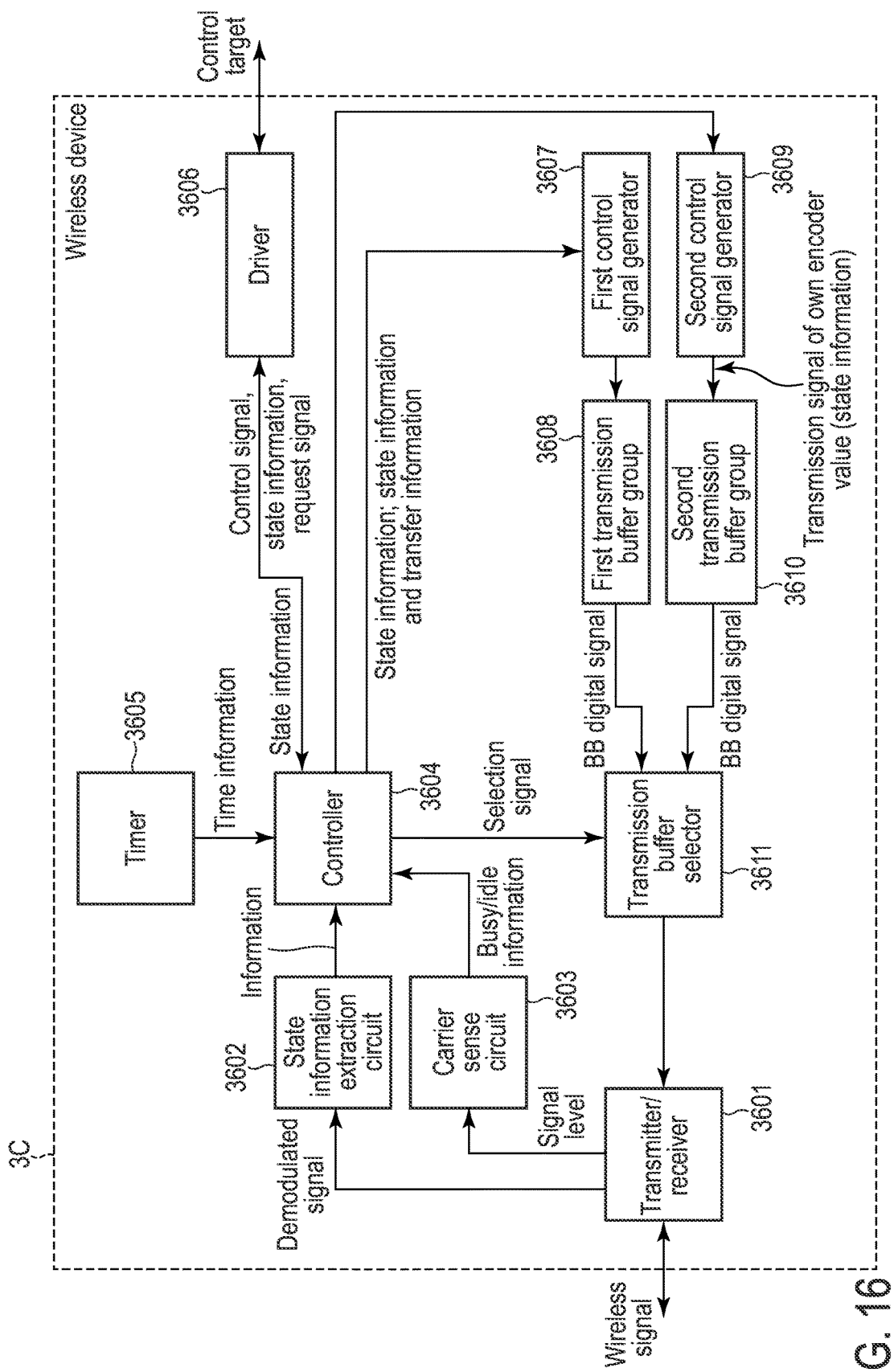
F I G. 16

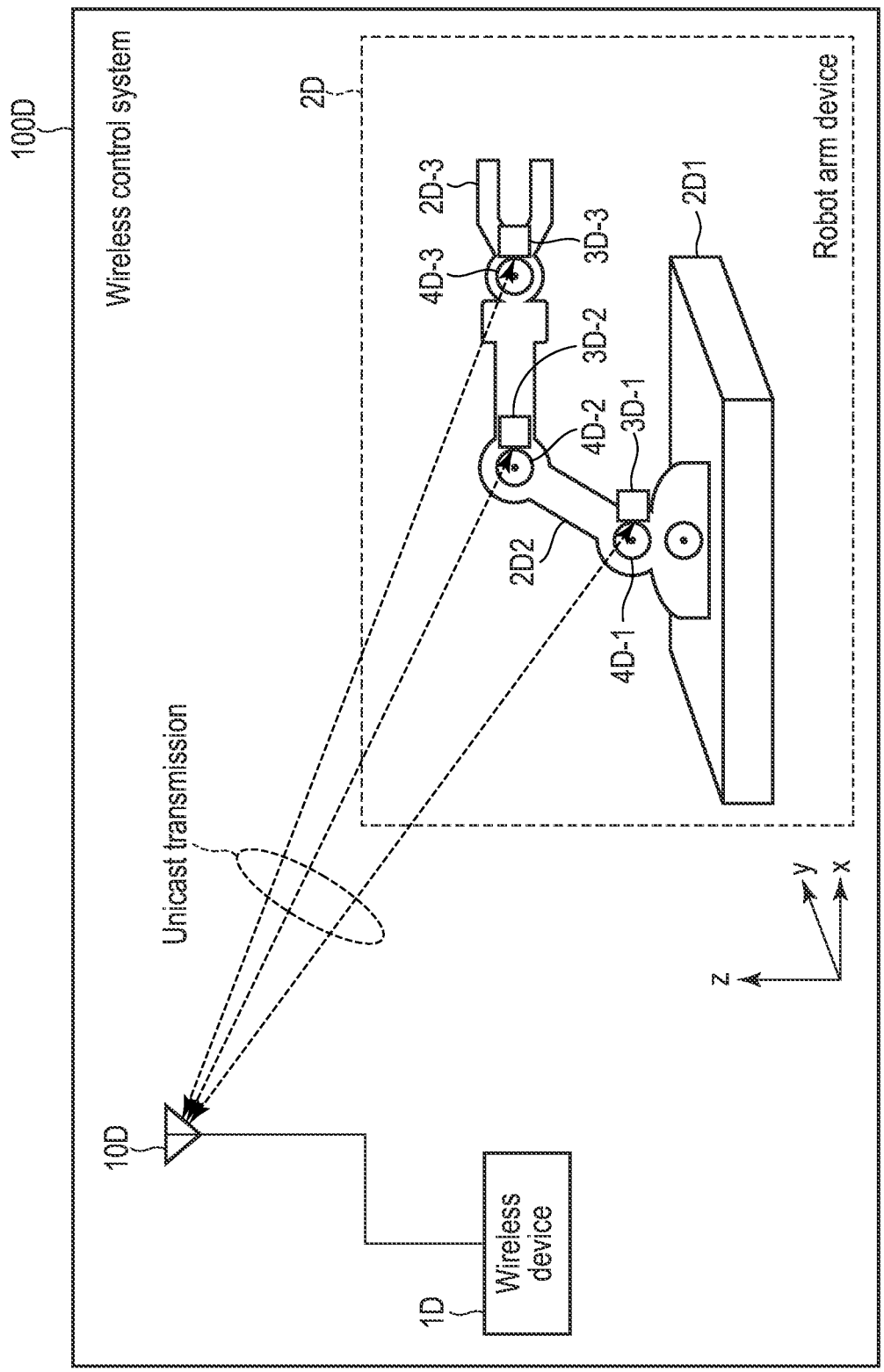
F I G. 20

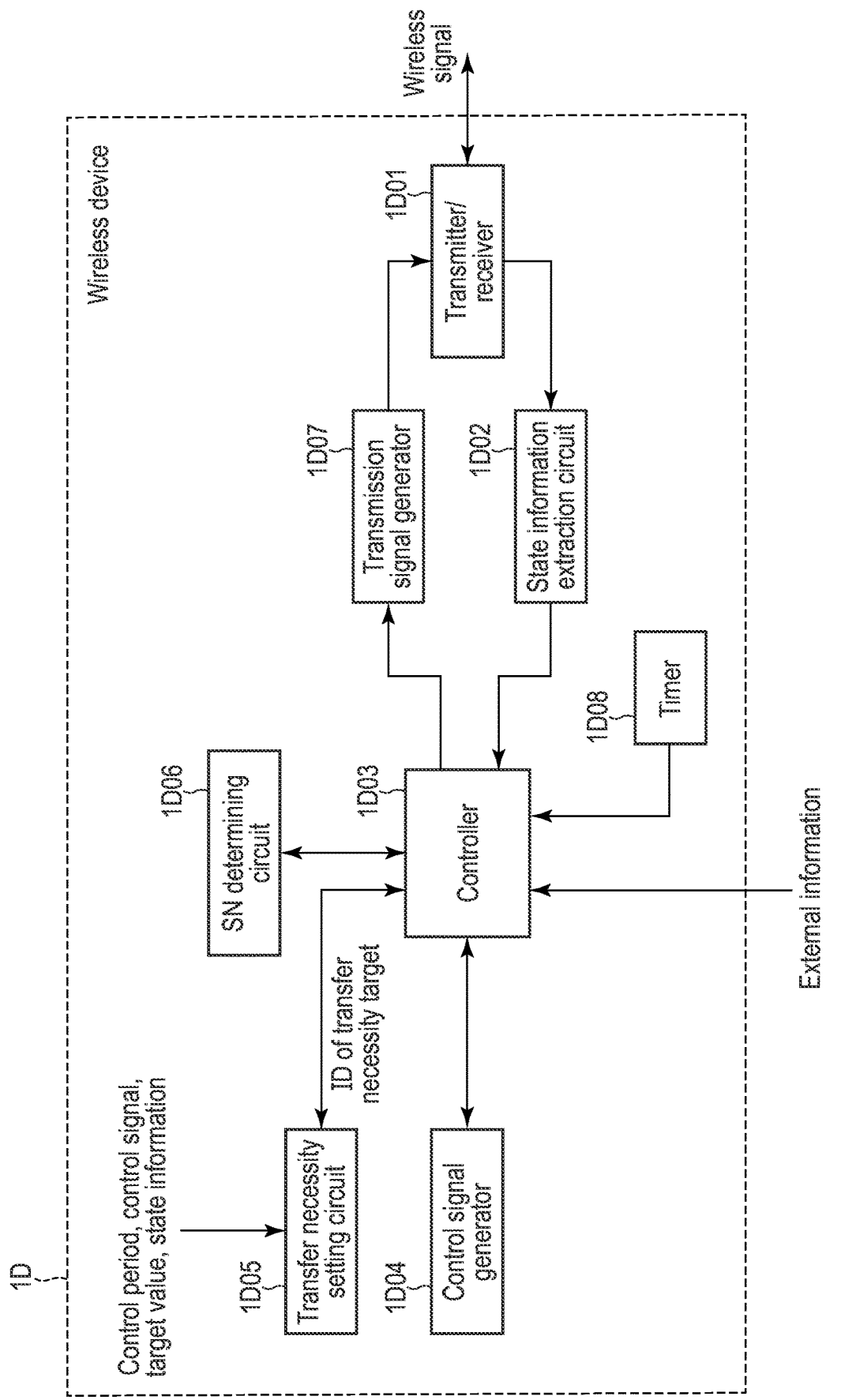
F I G. 21

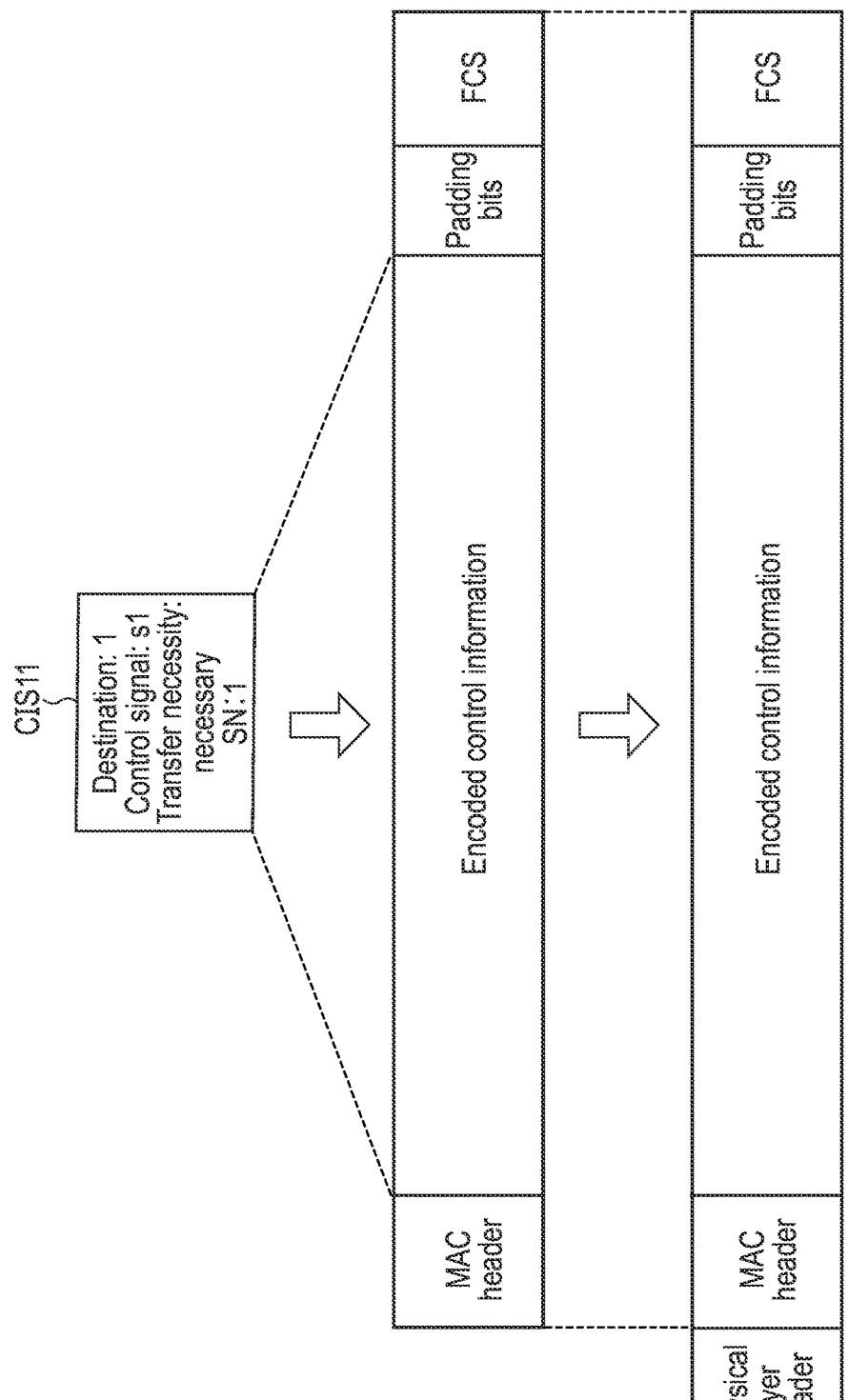
F I G. 22A
F I G. 22B
F I G. 22C

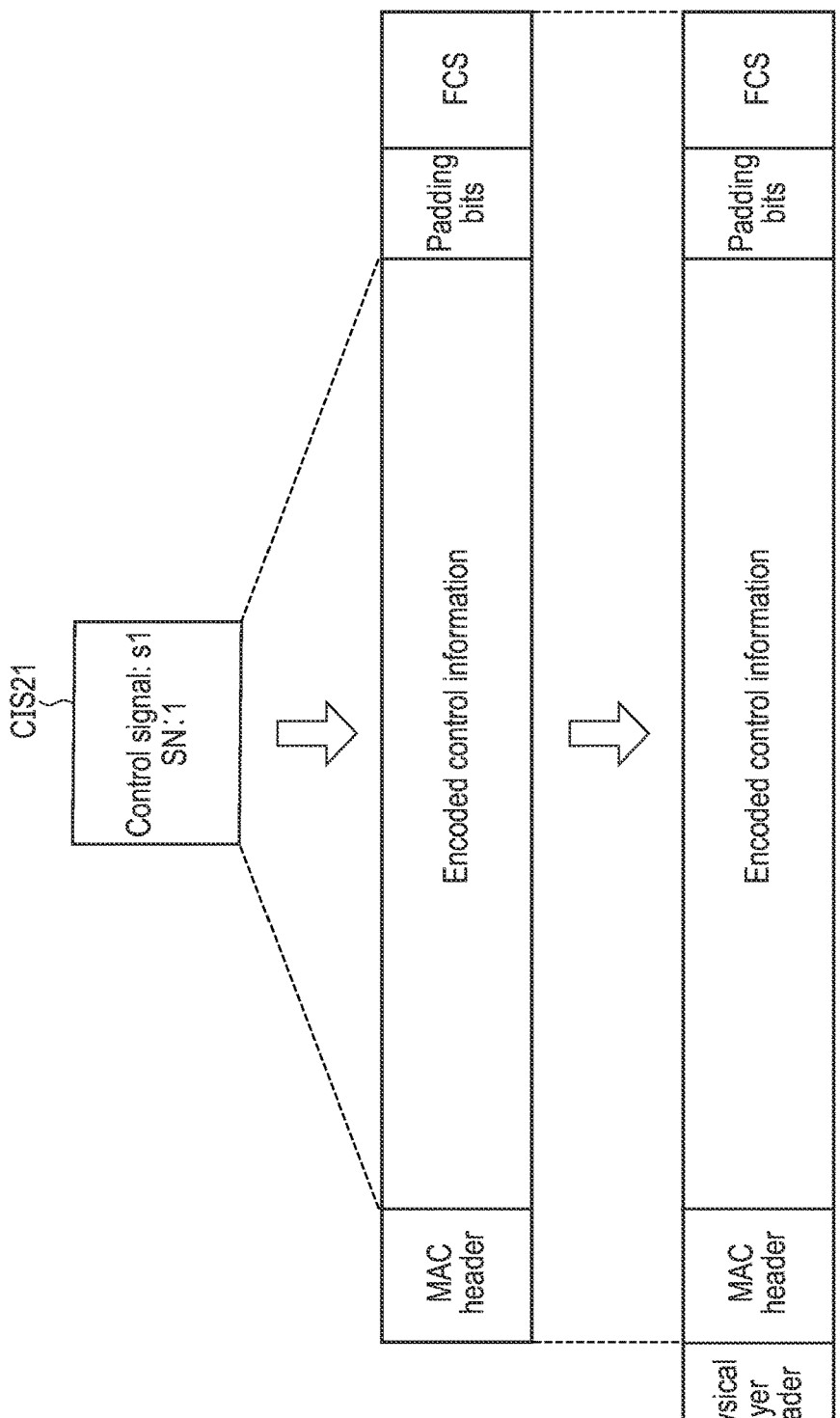

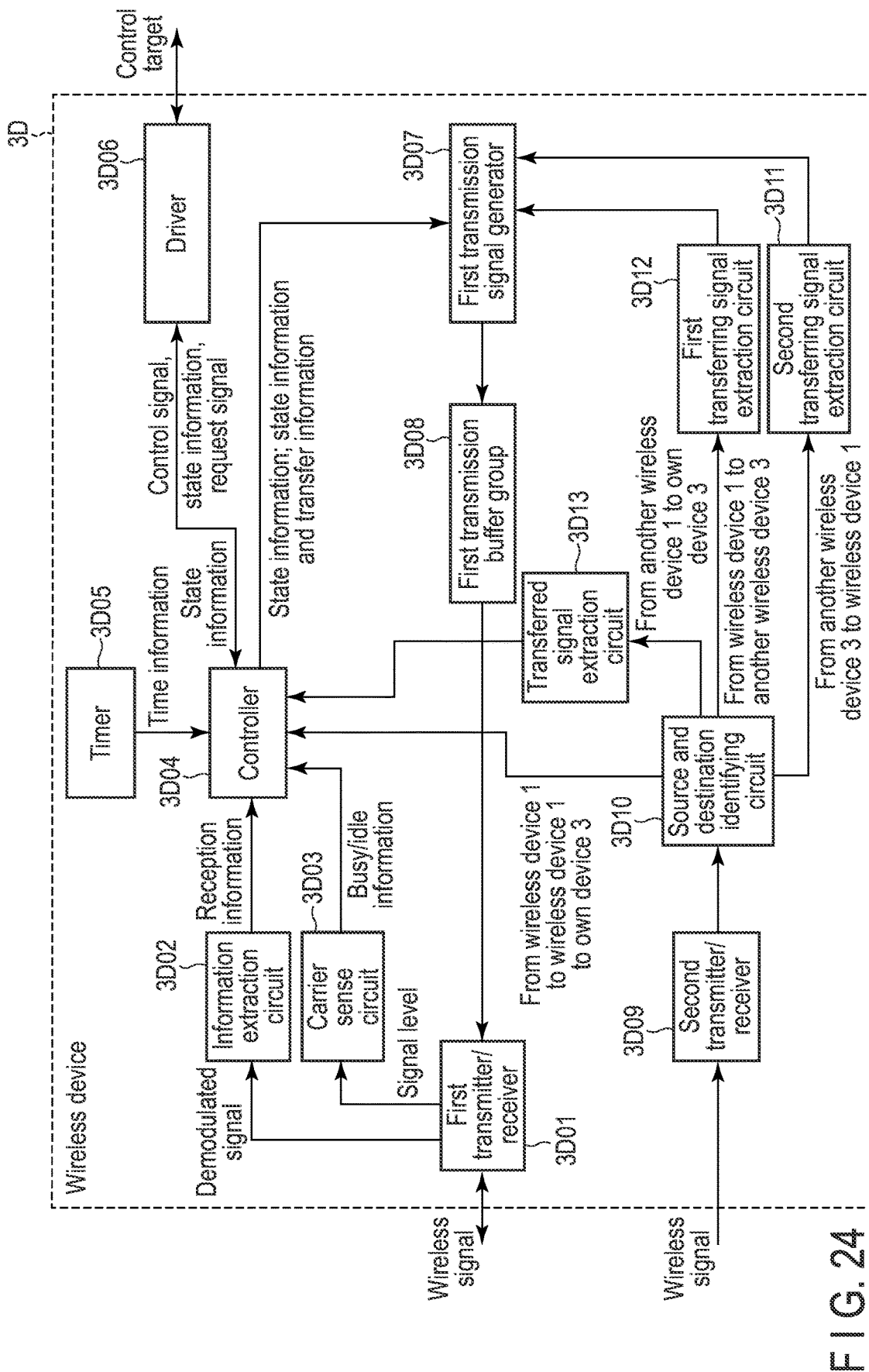
F I G. 24

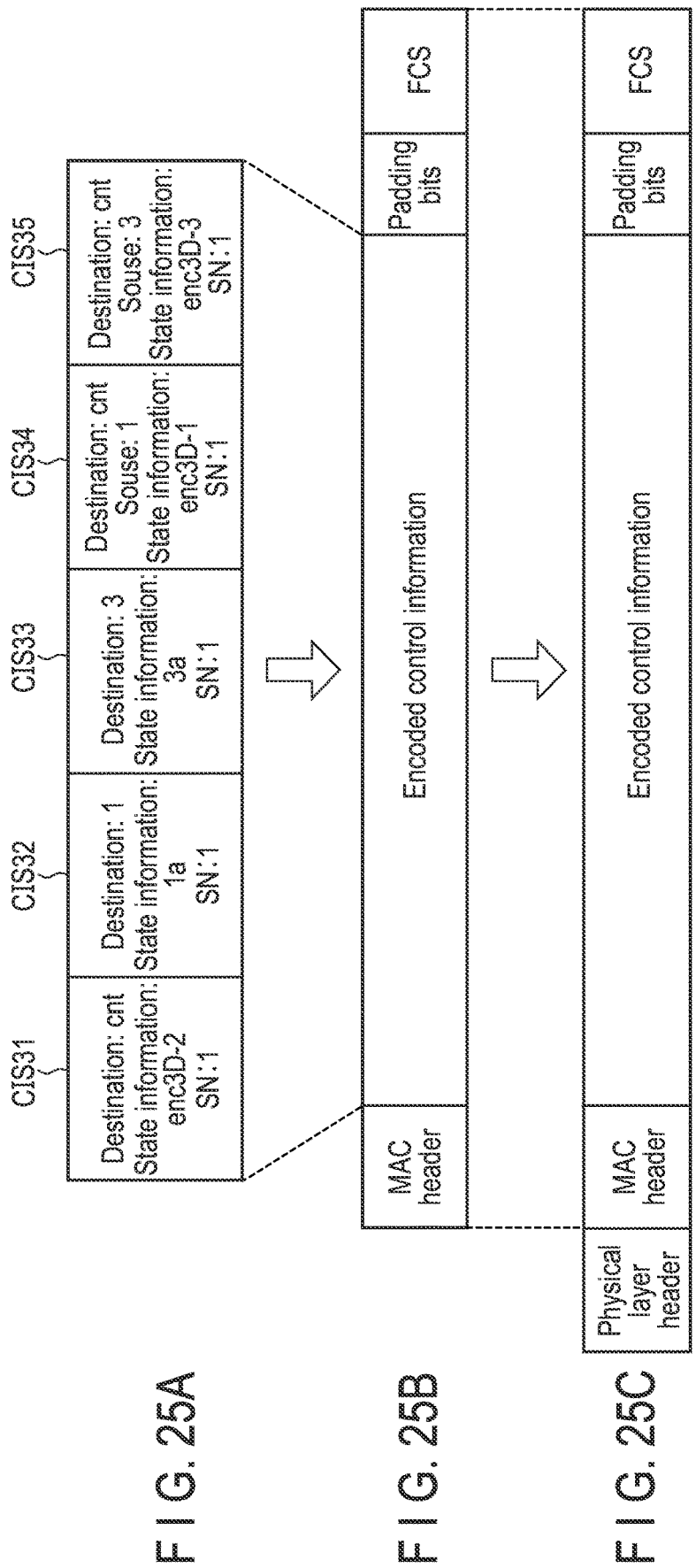

WIRELESS DEVICE, CONTROL SYSTEM, WIRELESS TRANSMISSION METHOD, AND STORAGE MEDIUM

CROSS-REFERENCE TO RELATED APPLICATIONS

This application is based upon and claims the benefit of priority from Japanese Patent Application No. 2021-151521, filed Sep. 16, 2021, the entire contents of which are incorporated herein by reference.

FIELD

Embodiments described herein relate generally to a wireless device, control system, wireless transmission method, and storage medium.

BACKGROUND

In a control system controlling a target such as a robot, wireless communication is used to eliminate a trouble caused by wirings and the risk of disconnection of the wirings.

However, communication errors of the wireless communication are likely to become problematic particularly when being applied to control of a target that requires low latency control.

BRIEF DESCRIPTION OF THE DRAWINGS

FIG. 5 is a block diagram illustrating an example of a wireless device as a controller according to the first embodiment.

FIG. 6 is a block diagram illustrating an example of a transfer necessity setting circuit according to the first embodiment.

FIG. 8 is a block diagram illustrating an example of a wireless device as a control target according to a second embodiment.

FIG. 10 is a block diagram illustrating an example of a wireless device as a controller according to a third embodiment.

FIG. 11 illustrates an example of a transfer ID according to the third embodiment.

FIG. 12 is a block diagram illustrating an example of a wireless device as a controller according to a fourth embodiment.

FIG. 13 illustrates an example of a transfer deadline in association with an air occupancy ration according to the fourth embodiment.

FIG. 15 is a flowchart illustrating an example of an operation of a wireless device as a controller according to the fifth embodiment.

FIG. 16 is a block diagram illustrating an example of a wireless device as a control target according to a sixth embodiment.

FIG. 20 illustrates an example of a wireless control system according to a tenth embodiment.

FIG. 21 is a block diagram illustrating an example of a wireless device as a controller according to the tenth embodiment.

FIGS. 22A, 22B, and 22C illustrate a first example of a data format of a transmission signal according to the tenth embodiment.

FIGS. 23A, 23B, and 23C illustrate a second example of the data format of the transmission signal according to the tenth embodiment.

FIG. 24 is a block diagram illustrating an example of a wireless device as a control target according to the tenth embodiment.

FIGS. 25A, 25B, and 25C illustrate a third example of the data format of the transmission signal according to the tenth embodiment.

DETAILED DESCRIPTION

Figure 1:
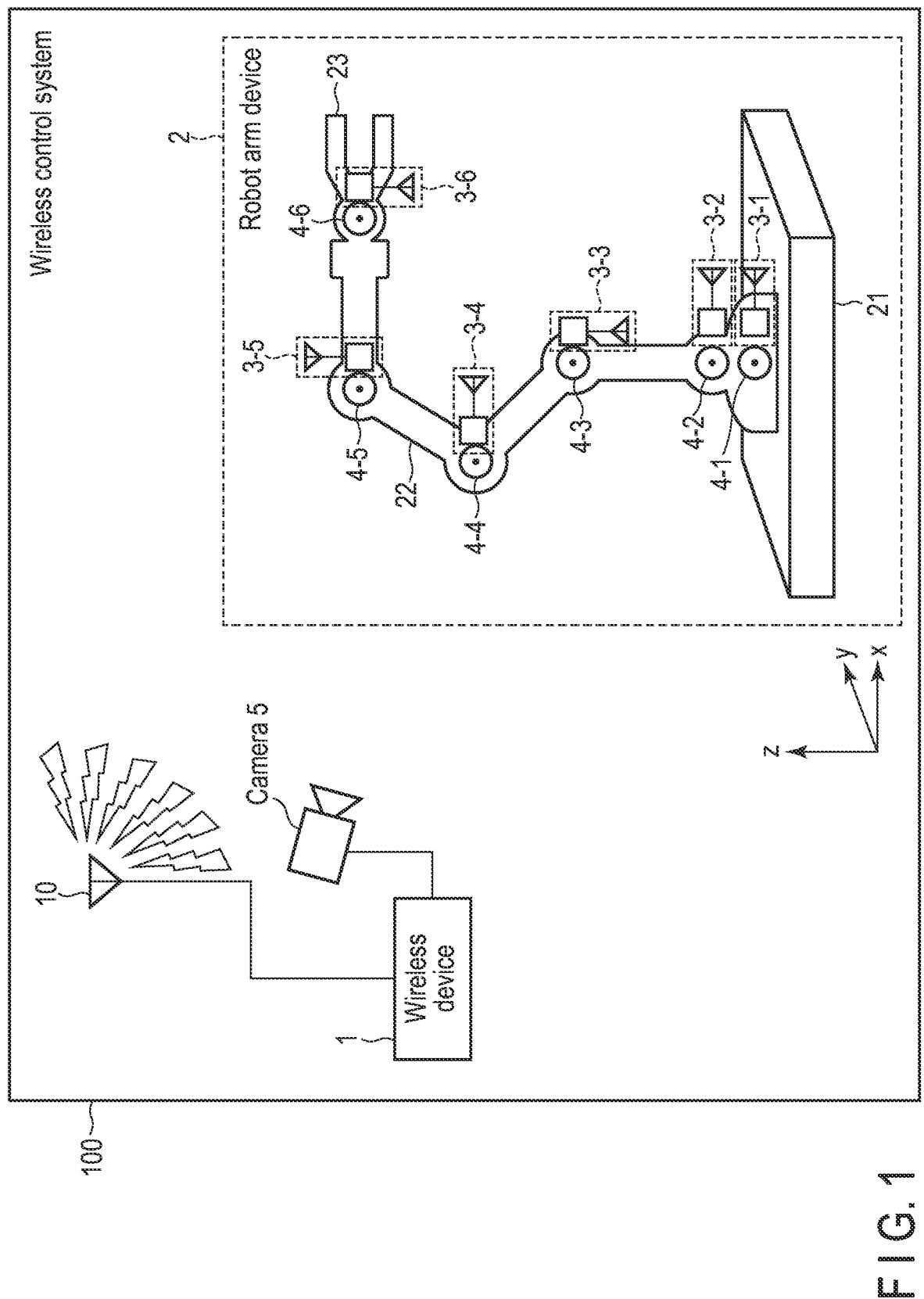
FIG. 1 is a block diagram illustrating an example of a wireless control system according to a first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a wireless device comprises circuitry configured to generate a control signal of a control target, generate transfer necessity indicating whether transfer of the control signal is necessary or unnecessary, generate control information including the control signal and the transfer necessity, and transmit a wireless signal corresponding to the control information.

First Embodiment

According to the first embodiment, a first wireless device transmits control signals of control targets to second wireless devices connected to the control targets, such as motors. The control signal includes transfer information related to transfer of the control signal. If the second wireless device receives a control signal of a motor connected to another second wireless device, the second wireless device transfers the control signal to the other second wireless device based on the transfer information.

FIG. 1 is a conceptual diagram of a wireless control system 100 according to the first embodiment. The wireless control system 100 includes a wireless device 1 and a robot arm device 2. The robot arm device 2 is a control target. The wireless device 1 controls the robot arm device 2. The wireless device 1 may be referred to as a controller wireless device.

The wireless device 1 may have functional modules for wireless communication and data processing. The wireless communication functional module is capable of wireless communication with an external device and may be an antenna and modulation/demodulation module. The data processing functional module may be a memory and CPU for processing data to be transmitted and received by wireless communication. The wireless communication functional module may be implemented by a CPU. The wireless device 1 can wirelessly transmit the control signal to wireless devices 3-1 to 3-6. Each of the wireless devices 3-1 to 3-6 may be referred to as a wireless device 3 when not individually distinguished. The wireless device 3 may be referred to as a control target wireless device.

The robot arm device 2 may perform work such as picking a load flowing on a belt conveyor. The robot arm device 2 includes a base 21, arms 22, and a gripper 23. A lowest arm 22 is connected to the base 21 via a motor 4-1. An uppermost arm 22 is connected to the gripper 23 via a motor 4-6. The remaining arms 22 are connected to each other via motors 4-2 to 4-5. Each of the motors 4-1 to 4-6 may be referred to as a motor 4 when not individually distinguished. A shape of the robot arm device 2 may be changed by driving the motors 4 to move the gripper 23 to any position (may be a three-dimensional position). The base 21 supports the arms 22. The gripper 23 itself may basically perform one-dimensional movements of gripping and releasing the load. Though not illustrated, the gripper 23 includes a motor for controlling the one-dimensional movements.

The motors 4-1 to 4-6 are connected to the wireless devices 3-1 to 3-6, respectively, in a wired manner or wireless manner.

The wireless device 3 may have a wireless communication functional module and data processing functional module. The wireless communicaton functional module is capable of wireless communication with an external device and may be an antenna and modulation/demodulation module. The data processing functional module may be a memory and CPU for processing data to be transmitted and received by wireless communication. The wireless communication functional module may be implemented by a CPU. If the wireless devices 3-1 to 3-6 receive the control information of own motors 4-1 to 4-6, the wireless devices 3-1 to 3-6 respectively control the own motors 4-1 to 4-6 according to the control information. The wireless devices 3-1 to 3-6 can receive state information indicative of states of the motors 4-1 to 4-6 from the motors 4-1 to 4-6. The state information may be indicative of an encoder value (sometimes referred to as a sensor value, a Hall sensor value, a set parameter value, or the like) of the motor.

The motor 4 may convert power to rotational motion or the like. An operation and a position of the robot arms 22 may be determined by the encoder value such as a rotation number of the motor 4. That is, the motor 4 may also have a sensor configured to detect the position of the robot arm device 2 (or the arms 22 or the like forming the robot arm device 2). The encoder value of the motor 4 may correspond to a sensor value. A center of the rotation of the motor 4 may be referred to as an axis. Although the encoder value of the motor 4 is used as the sensor value according to the first embodiment, the sensor value obtained by a gyro sensor or the like may be used. The wireless device 1 receives state information of the motors 4-1 to 4-6 from the wireless devices 3 by wireless communication, and may detect positions and the like of the motors 4-1 to 4-6 and generate the control information including control signals of the motors 4-1 to 4-6 and transfer information indicative of transfer of the control signal. The positions of motors 4-1 to 4-6 may be detected based on a coordinate system defined in the control system 100.

The wireless device 1 and each of the wireless devices 3-1 to 3-6 may be synchronized in time. Regarding a time synchronization technique, any technique such as Network Time Protocol (NTP) may be used. The wireless device 1 and each of the wireless devices 3-1 to 3-6 may separately receive time information from a server or the like with which wireless communication is performed, and share the time information. The wireless device 1 and each of the wireless devices 3-1 to 3-6 are not necessarily synchronized in time.

Although the robot arm device 2 is illustrated as a control target according to the first embodiment, the control target is not necessarily limited to the robot arm device 2. According to the first embodiment, a wireless communication scheme for transmitting and receiving the control information and the state information is assumed to be a wireless LAN, but may be other wireless communication standards such as ZigBee (registered trademark) and local 5G or may be a unique standard without being particularly limited.

The control information transmitted from the wireless device 1 to the wireless devices 3-1 to 3-6 may be a unicast signal to any of the wireless devices 3-1 to 3-6, a multicast signal to a plurality of devices among the wireless devices 3-1 to 3-6, or a broadcast signal including all the wireless devices 3-1 to 3-6.

The wireless devices 3-1 to 3-6 may transmit the state information. The state information transmitted by each of the wireless devices 3-1 to 3-6 may be a unicast signal to the wireless device 1, a multicast signal to the wireless device 1 and other wireless devices 3-1 to 3-6, or a broadcast signal to the wireless device 1 and the other wireless devices 3-1 to 3-6. The wireless device 3 receiving the unicast signal may respond confirmation by an ACK frame or the like. The wireless device 1 transmitting the unicast signal may retransmit a transmission signal depending on the presence or absence of the confirmation response.

The number of the motors 4 is not necessarily limited to six, and may be any plural number. The number of the wireless devices 3 is not necessarily limited to six, and may be any number. Although each of the wireless devices 3 controls the single motor 4 connected thereto according to the first embodiment, each of the wireless devices 3 may control a plurality of motors 4. The wireless device 1 may specify IDs of the motors 4 as destinations of the control information, and the wireless devices 3 may control the motors 4 based on the IDs of the motors 4 which are the destinations of the received control information among the connected motors 4. Although FIG. 1 illustrates only the single robot arm device 2, the robot arm device 2 is not limited to one, and a plurality of robot arm devices 2 may be provided. The wireless device 1 is not limited to control the single robot arm device 2, and may control a plurality of robot arm devices 2. A plurality of wireless devices 1 may be provided.

Figure 2:
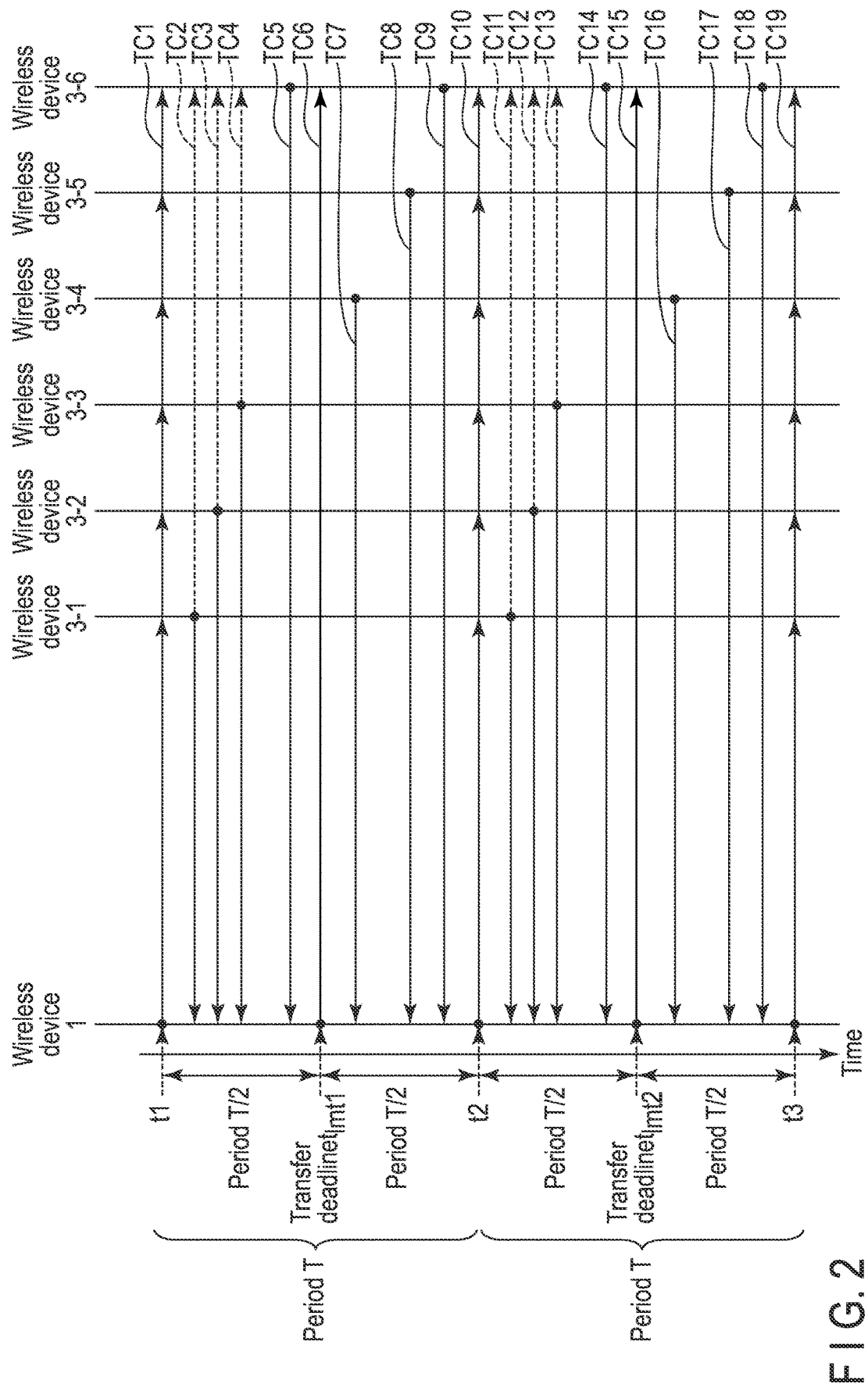
FIG. 2 is a timing chart illustrating an example of an operation of the wireless control system according to the first embodiment.

FIG. 2 is a timing chart illustrating a first operation example of the wireless control system 100 according to the first embodiment. A smaller delay is required for control of the motor 4-6 than the control of the other motors 4. The control signal of the wireless device 3-6 (or motor 4-6) is a transfer target, i.e., a target to be transferred. It is assumed that the time synchronization is achieved between the wireless device 1 and each of the wireless devices 3-1 to 3-6.

The wireless device 1 transmits control signals TC1 to the wireless devices 3-1 to 3-6 by broadcast at a time t1. The wireless device 1 transmits control signals TC10 to the wireless devices 3-1 to 3-6 by broadcast at a timing when a time of the period T is elapsed since the transmission of the signals TC1 by broadcast. The wireless device 1 transmits a control signal TC6 to the wireless device 3-6 by unicast at a timing when a time of the period T/2 is elapsed since the transmission of the control signals TC1 by broadcast. The wireless device 1 transmits a control signal TC15 to the wireless device 3-6 by unicast at a timing when a time of the period T is elapsed since the transmission of the signal TC6 by unicast.

The wireless devices 3-1 to 3-5 transmit state information at the period T. For example, the wireless device 3-1 transmits state information TC2 and TC11 at the period T. The wireless device 3-6 transmits state information TC5 and TC9 at the period T/2. The transmission orders and timings of the wireless devices 1 and 3-1 to 3-6 do not need to be fixed. The transmission timings of the wireless device 1 and 3-1 to 3-6 may vary depending on a carrier sense situation before transmission or the like, and the transmission orders may also vary. The ACK frame or the like, which is a wireless signal for confirmation of wireless signal reception may be transmitted, but is not shown in FIG. 2.

The wireless device 1 generates the control signal using the state information received at a certain period as feedback information, and transmits the control signal at a certain period.

FIGS. 3A and 3B illustrate examples of a data format of a transmission signal according to the embodiment. FIG. 3A is an example of a transmission signal transmitted by the wireless device 1 to all the motors 4 or a plurality of the motors 4 (all axes or plural axes) by broadcast or multicast. FIG. 3B is an example of a transmission signal transmitted by the wireless device 3.

FIG. 3A illustrates control information 131-1 to 131-6. Each of the control information 131-1 to 131-6 includes a destination, control signal, and transfer information. The transfer information includes transfer necessity and transfer deadline of the control information.

For example, the control information 131-3 includes a destination "3-3" (corresponding to the wireless device 3-3), control signal "3a" of the wireless device 3-3, transfer necessity "unnecessary", and transfer deadline "none". The control information 131-6 includes a destination "3-6" (corresponding to the wireless device 3-6), control signal "6a" of the wireless device 3-6, transfer necessity "necessary", and transfer deadline "t0".

A transmission signal 171 is an example of a signal transmitted as a wireless signal. The transmission signal 171 includes a header and a payload. The header may be a physical layer header or a MAC layer header. The payload includes data 131 which is the control information 131-1 to 131-6.

For example, when the wireless device 3-3 receives the transmission signal 171, the wireless device 3-3 extracts the control signal 3a from the control information 131-3 addressed to own device, and controls the connected motor 4-3 based on the control signal 131-3.

When the wireless device 3-3 confirms control information addressed to another device and determines that the transfer necessity is "necessary", the wireless device 3-3 may transfer the control information including the transfer necessity "necessary" at the same time when transmitting its state information.

FIG. 3B is an example in which the wireless device 3-3 transmits own state information "enc3a" and control information of the wireless device 3-6. The control information of the wireless device 3-6 may include the transfer information, such as the transfer necessity and transfer deadline.

In such a case, when the wireless device 3-3 transmits a signal 371 and a wireless device 3 (referred to as a wireless device "A") other than the destination wireless device 3-6 receives the signal 371, the wireless device "A" may transmit the control information (may including the transfer information) addressed to the destination wireless device 3-6 with its own state information similarly to the signal 371 to enable the transfer of the control information of the destination wireless device 3-C by multi-hop.

Returning to FIG. 2, the wireless device 1 sets the wireless device 3-6 as a transfer target to which the control information needs to be transferred and sets a time after a lapse of the period T/2 since transmission of the corresponding frame (control information) as the transfer deadline. In this specification, the control target to which the control information needs to be transferred is referred to as a transfer necessity target.

Times tlmt1 (=t1+T/2) and tlmt2 (=t2+T/2) in FIG. 2 correspond to the above transfer deadline. The transfer deadline may be a time after an elapsed time (for example, the period T/2) immediately before generation of the transmission signal of the corresponding frame. Instead of the time, a time width T/2 may be set as the transfer deadline.

When the time synchronization between the respective wireless devices (the wireless device 1 and the wireless devices 3) is achieved in the wireless control system as in the present embodiment, the transfer deadline may be defined as the time or may be defined as the time width. Even when the time synchronization between the respective wireless devices is not achieved the transfer deadline may be defined as the time width.

The wireless device 3 receiving the transfer deadline may set a time (t0_r+T_r), obtained by adding a reception time of the transfer deadline as a reference time (t0_r) and a value of the transfer deadline (T_t), as a new transfer deadline. The reference time t0_r, the transfer deadline, and the like may be based on time information stored in the devices, respectively.

When the transfer deadline is not set, a wireless device 3 (referred to as a wireless device "B") receiving the control information for the other wireless device 3 (referred to as a wireless device "A") may transfer the received control information until receiving the next control information for the wireless device "A". That is, in this case, a reception time of the next control information for the wireless device "A" may be considered as the transfer deadline (time).

As the transmission signal TC2 of FIG. 2, the wireless device 3-1 transmits its encoder value to the wireless device 1 by the transfer deadline of the wireless device 3-6. The wireless device 3-1 generates a wireless frame including the encoder value of the wireless device 3-1 and a control signal of the wireless device 3-6. The wireless device 3-1 transmits the wireless frame TC2 to the wireless devices 1 and 3-6 by multicast, instead of transmitting only the encoder value to the wireless device 1.

The wireless devices 3-2 and 3-3 transmit own encoder values to the wireless device 1 by the transfer deadlines of the wireless device 3-6. The wireless devices 3-2 and 3-3 generate wireless frames including the state signals of the wireless devices 3-2 and 3-3 and the control signal of the wireless device 3-6. The wireless devices 3-2 and 3-3 transmit wireless frames TC3 and TC4 by multicast.

By multicasting the frames TC2 to TC4, the wireless device 3-6 receives the control information from the wireless device 1 and the control signal from the wireless devices 3-1 to 3-3 which are the same signal. Even if the reception of the control signal fails due to the influence of a transmission path or radio interference, the wireless device 3-6 can control the motor 6 control signal as long as at least one or more control signal among the control signal transferred by the other wireless devices 3 and 1 can be received.

The wireless device 3-6 transmits a state signal TC5 including the encoder value after receiving the first control signals TC1, receives a second control signal TC6 from the wireless device 1 by unicast, and transmits a state signal TC9 including the encoder value. If the wireless device 3-6 has failed to receive the second control signal TC6, the wireless device 1 can determine that the reception has failed through non-reception of the ACK frame, and retransmit the second control signal TC6.

Since the transmission time for the wireless device 1 is after the transfer deadline, the wireless devices 3-4 and 3-5 transmit only the encoder values TC7 and TC8 to the wireless device 1. Thereafter, these processes are repeated periodically.

Figure 4:
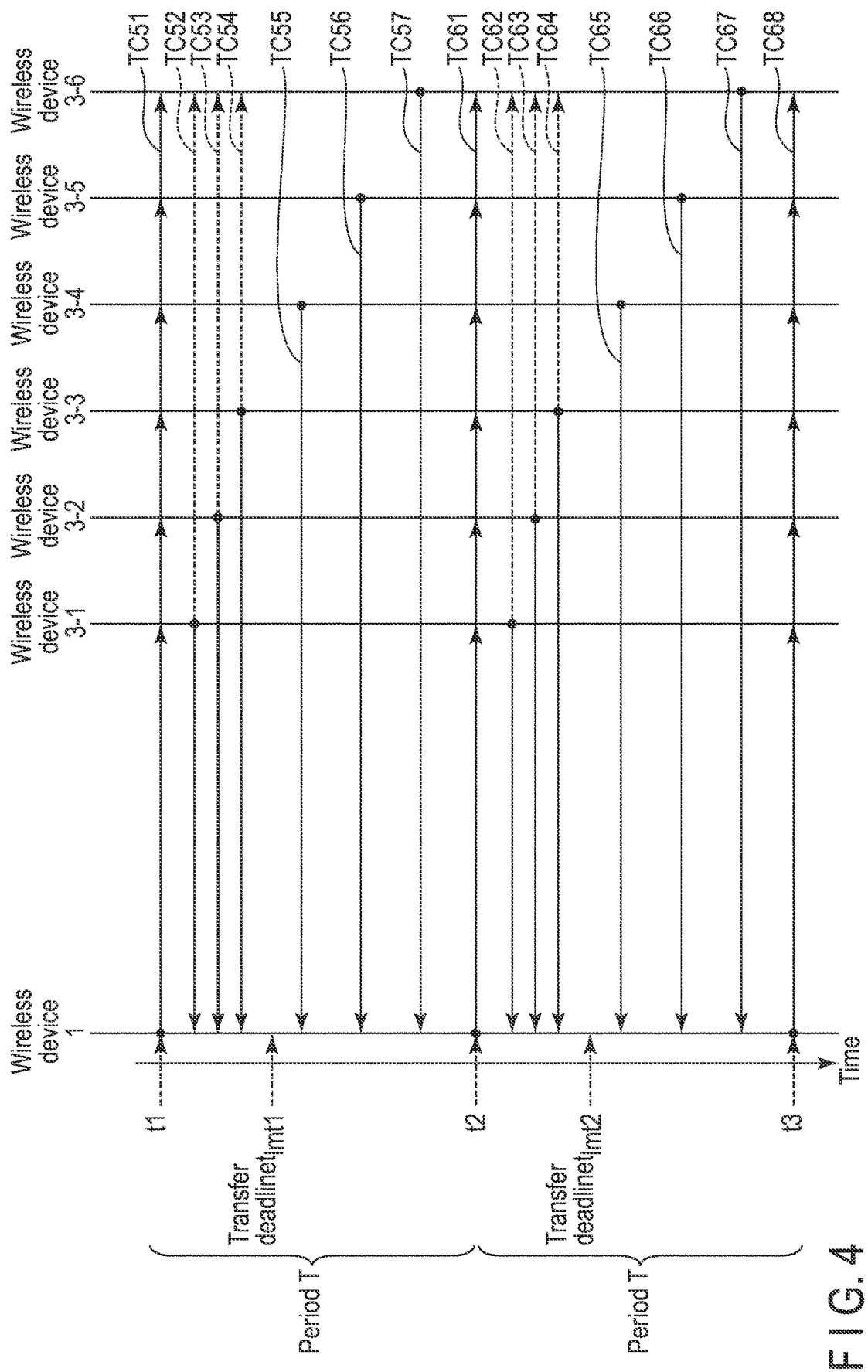
FIG. 4 is a timing chart illustrating another example of an operation of the wireless control system according to the first embodiment.

FIG. 4 is a timing chart illustrating a second operation example of the wireless control system 100 according to the first embodiment. Higher reliability of the control signal transmission to the wireless device 3-6 is required as compared with the other wireless devices 3-1 to 3-5. The wireless device 3-6 is set as the transfer destination (to which the control signal needs to be transferred). The time synchronization is achieved between the wireless device 1 and each of the wireless devices 3-1 to 3-6.

Figure 3:
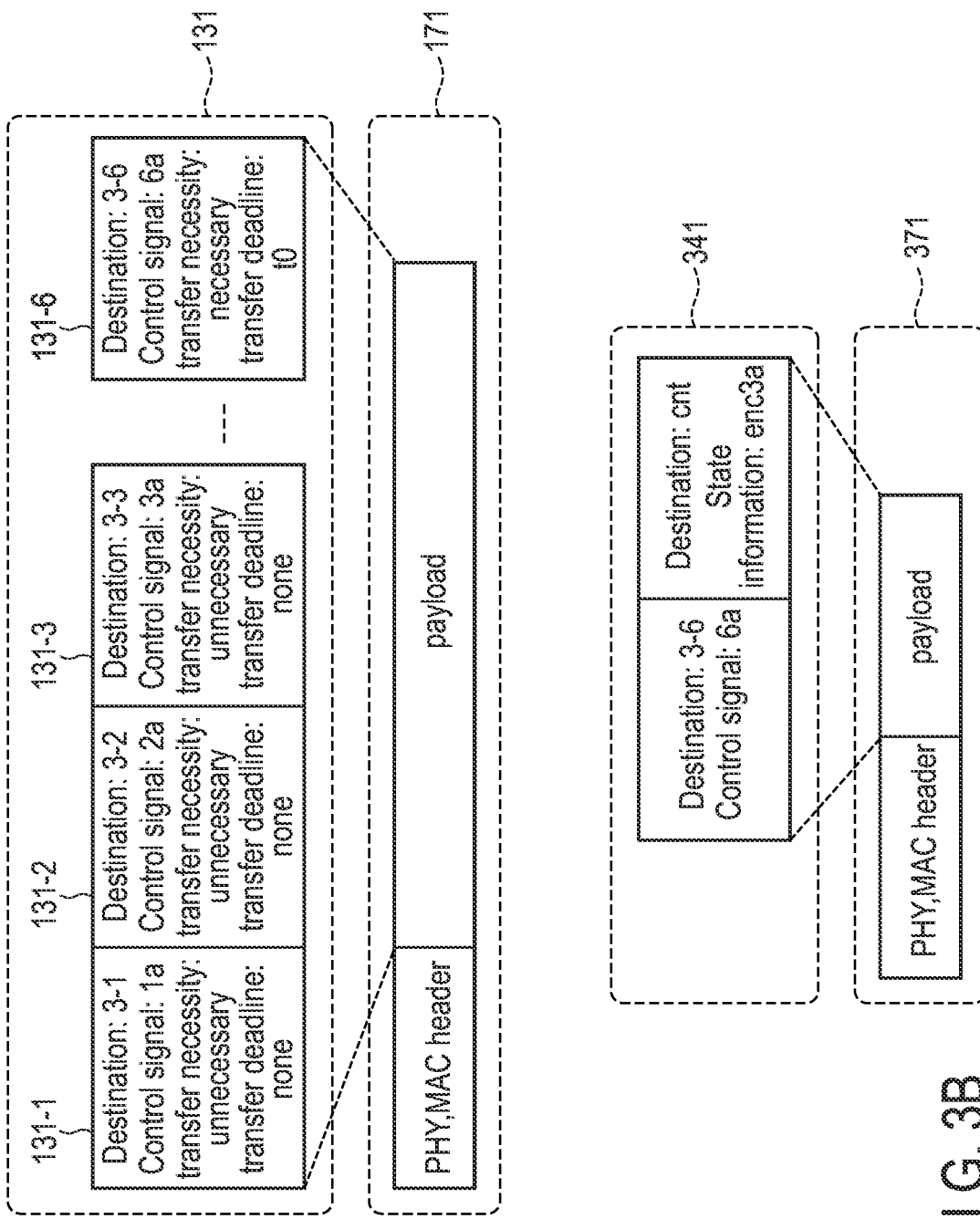
FIGS. 3A and 3B illustrate an example of a data format of a transmission signal according to the first embodiment.

A difference from FIG. 2 is that all control periods for the wireless devices 3-1 to 3-6 are the period T (for example, an interval between control signals TC51 and TC61 in the case of the wireless device 3-6), and all periods of the state information transmitted by the wireless devices 3-1 to 3-6 are also the period T (for example, an interval between transmission signal TC52 and TC62 in the case of the wireless device 3-1). As illustrated in FIG. 3, the first embodiment is not limited to the difference in the control period with respect to the wireless device.

FIG. 5 is a functional block diagram illustrating an example of the wireless device 1 according to the first embodiment.

The wireless device 1 includes a transmitter/receiver 11, state information extraction circuit 12, controller 13, control signal generator 14, transfer necessity setting circuit 15, transfer deadline setting circuit 16, transmission signal generator 17, and timer 18. The state information extraction circuit 12, controller 13, control signal generator 14, transfer necessity setting circuit 15, transfer deadline setting circuit 16, transmission signal generator 17, and the like may be configured as programs, and may be also executed by a computer or the like that has a data processing functional module such as a CPU and a memory provided in the wireless device 1.

The transmitter/receiver 11 receives and demodulates a wireless transmission signal, and outputs a demodulated reception signal to the state information extraction circuit 12. The transmitter/receiver 11 performs encoding processing such as error correction on a transmission signal input from the transmission signal generator 17, adds a physical layer header, a MAC header, and the like, and transmits a modulated wireless signal.

The state information extraction circuit 12 extracts the state information from the reception signal input from the transmitter/receiver 11 and outputs the state information to the controller 13. The controller 13 may store the received state information of each of the motors 4 in a storage device (not illustrated) or update the stored state information. The state information extraction circuit 12 may store a reception time (or a time when the wireless device 3 transmits state information) in association with the state information of each of the motors 4.

The controller 13 may also include a program and the like executed by a computer or the like that has a data processing function such as a CPU and a memory. The controller 13 receives the state information from the state information extraction circuit 12 and receives external state information from the outside of the wireless device 1. The controller 13 receives t-ne information from the timer 18.

The controller 13 periodically outputs the state information to the control signal generator 14 based on the time information, outputs a target value calculated based on the program incorporated in advance or the external information, and receives the control signal from the control signal generator 14. The target value is, for example, an assumed value of the next state of the robot arm device 2, and may be an encoder value (set parameter) that needs to be set next for the motor 4. The controller 13 may generate the next control signal based on the target value.

Next, the controller 13 outputs the control period, control signal, target value, or state information to the transfer necessity setting circuit 15, and receives an ID of the transfer necessity target (wireless device) from the transfer necessity setting circuit 15. Next, the controller 13 outputs the ID and control period of the transfer necessity target to the transfer deadline setting circuit 16. The controller 13 receives a transfer deadline for the transfer necessity target from the transfer deadline setting circuit 16. Next, the controller 13 outputs the control signal, ID, and transfer deadline of the transfer necessity target to the transmission signal generator 17.

The control signal generator 14 inputs the state information and target value from the controller 13, generates the control signal, and transmits the control signal to the controller 13. The generation of the control signal will be described hereinafter.

When a rotation number $x_n(t)$ of a motor "n" (the motor "n" indicating any motor 4) at time t is set as a target value, and the latest encoder value $y_n(t)$ of the motor "n" input by the time t is set as state information, a rotation speed $v_n(t)$ of the motor "n" is calculated as follows.

$$v_n(t) = K_n \times (x_n(t) - y_n(t))$$

Here, $K_n$ is a feedback gain of the motor "n". This rotation speed is the control value for the motor "n", and predetermined conversion processing determined in advance for this control value may be performed to obtain the control signal.

The transfer necessity setting circuit 15 receives the control period, control signal, target value, or state information from the controller 13, determines the transfer necessity target, and outputs an ID of the transfer necessity target to the controller 13. The determination of the transfer necessity target will be described hereinafter. The transfer necessity target not only simply indicates the wireless device 3 but also indicates the motor 4 to be controlled or the connected wireless device 3 together with the controlled motor 4.

A case where a control period differs depending on a control target as illustrated in FIG. 2 is considered. The transfer necessity setting circuit 15 sets, for example, a control target whose input control period is a period shorter than a certain time (such as a predetermined threshold) as the transfer necessity target.

For example, when a wireless device having a control period shorter than T is determined as the transfer necessity target in FIG. 2, the transfer necessity setting circuit 15 sets the wireless device 3-6 as the transfer necessity target. The determination of the transfer necessity target (a transfer destination ID) by the transfer necessity setting circuit 15 will be described in detail hereinafter.

In the example of the robot arm device 2 illustrated in FIG. 1, a transmission frequency (control period) of the control signal differs for each of the motors 4. For example, it is necessary to finely control the motor 4-6 that operates the gripper 23, but it is unnecessary to control the motors 4 other than the motor 4-6 frequently to such an extent. In such a case, with respect to the motor 4-6, it is possible to shorten the control period of the control signal from the wireless device 1. However, an error may occur in transmission since the control signal is transmitted wirelessly. The transfer necessity setting circuit 15 sets a control target whose control period is a period shorter than a certain time, for example, the motor 4-6, as the transfer necessity target. According to the first embodiment as described above, whether or not transfer is necessary can be determined based on the control period of the control target (motor 4).

Next, a case where control periods of control targets are the same as illustrated in FIG. 4 will be described. In this case, the transfer necessity setting circuit 15 sets a control target in which an absolute value of a difference between a target value and an encoder value (state information) is the maximum as the transfer necessity target. That is, the transfer necessity setting circuit 15 calculates the absolute value of the difference between the target value of the rotation number of the motor "n" and the encoder value as follows.

$$s_n |x_n(t) - y_n(t)|$$

The transfer necessity setting circuit 15 selects the motor 4 having the maximum value $s_n$ from among the values $s_n$ respectively calculated for the plurality of motors 4, and determines the selected motor 4 as the transfer necessity target. The transfer necessity setting circuit 15 may determine not only one but also a plurality of motors 4 as the transfer necessity targets.

Another example of the transfer necessity setting circuit 15 will be described. The transfer necessity setting circuit 15 calculates a difference between a target value and state information. When the difference is greater than a predetermined threshold for a control target, the transfer necessity setting circuit 15 sets the transfer necessity of the control signal to the control target as "necessary".

FIG. 6 illustrates an example of the transfer necessity setting circuit 15. A difference calculator calculates a difference between an input target value and state information, and a comparator compares a value of the difference and the threshold. For example, when the difference value is greater than a threshold, the transfer necessity setting circuit 15 sets the transfer necessity of the control signal to the corresponding control target as "necessary".

Another example of the transfer necessity setting circuit 15 will be described. The transfer necessity setting circuit 15 calculates a rotation speed of the motor "n" from past state information and current state information, and calculates an acceleration of the rotation speed from the rotation speed, a target value, and a control period. The transfer necessity setting circuit 15 sets a motor having the largest acceleration among the calculated rotation speeds of the motors as the transfer necessity target. Alternatively, the transfer necessity setting circuit 15 may determine a motor having the calculated acceleration of the rotation speed of the motor greater than a predetermined threshold as the transfer necessity target.

When a rotation direction of the control target (for example, motor 4) changes, the transfer necessity setting circuit 15 may determine that transfer is necessary for the moto 4. When a delay of an operation of the control target (for example, motor 4) is equal to or greater than a threshold, the transfer necessity setting circuit 15 may determine that transfer is necessary for the motor 4.

Still another example of the transfer necessity setting circuit 15 will be described. The transfer necessity setting circuit 15 compares reception power of a wireless signal received from each of the wireless devices 3, and determines the wireless device 3 having the lowest reception power as the transfer necessity target.

Still another example of the transfer necessity setting circuit 15 will be described. The transfer necessity setting circuit 15 compares a reception timing of a wireless signal from each of the wireless devices 3, and determines the wireless device 3 for which the longest time has passed since the last reception as the transfer necessity target. More specifically, the transfer necessity setting circuit 15 may confirm a reception time interval of a wireless signal received from each of the wireless devices 3. The transfer necessity setting circuit 15 may determine the motor 4 connected to the wireless device 3 for which the longest time has passed since the last reception of the wireless signal as the transfer necessity target.

Still another example of the transfer necessity setting circuit 15 will be described. The transfer necessity setting circuit 15 compares request reliability received from the controller 13 and determines the wireless device 3 having the highest request reliability as the transfer necessity target. The required reliability is calculated by the program of the controller 13 according to a processing content of the robot arm device 2.

Still another example of the transfer necessity setting circuit 15 will be described. When the controller 13 receives an emergency stop message, the transfer necessity setting circuit 15 sets all the wireless devices 3 as the transfer necessity targets.

The transfer deadline setting circuit 16 receives an IC of the transfer necessity target from the controller 13 and a control period of the transfer necessity target, and outputs a transfer deadline to the transfer necessity target to the controller 13. The transfer deadline setting circuit 16 may set the control period of the transfer necessity target as the transfer deadline, or half of the control period of the transfer necessity target as the transfer deadline. The transfer deadline setting circuit 16 may set the transfer deadline based on the urgency and priority of the motor 4 which is a transmission destination of the control signal. A value of the transfer deadline may be set as a value based on the absolute time output from the timer 18, the time in the system, or the like.

The transfer deadline se-Ling circuit 16 may determine the transfer deadline as follows, but there is no intention to limit conditions.

The transfer deadline is set to be shorter as a smaller delay is required for control of a control target (the motor 4 or the like).

The transfer deadline is set based on the communication quality and an air occupancy ratio of a transfer destination control target (the motor 4 or the like) of the wireless device 1.

The transfer deadline is set to be long in a case of transmitting (transferring) control information that is not to be updated for a while afterwards, such as an emergency stop.

The conditions for setting the transfer deadline illustrated herein may be used as a condition for the transfer necessity setting circuit 15 to determine the transfer necessity.

The transmission signal generator 17 generates a transmission signal including the control information. The control information includes the control sign-al of a control target input from the controller 13, transfer necessity (an ID of the transfer necessity target), and transfer deadline (a transfer deadline to the transfer necessity target). The transmission signal generator 17 outputs the transmission signal to the transmitter/receiver 11.

The timer 18 has time information and outputs the time information to the controller 13 and the transfer deadline setting circuit 16. The time information may be the absolute time provided by a clock, a GPS, or an NTP server, or the system time defined in the system 100.

The external information may be information input by a human through an external controller, information input by a human by pressing a button such as an emergency stop button, information of a moving image or a still image captured by a camera, or a result obtained by a computer analyzing the moving image or still image captured by the camera. The wireless device 1 may be connected to peripheral devices, such as a microphone, a mouse, and a keyboard, various controllers, a personal computer, and the like in addition to the camera. The wireless device 1 may transmit and receive data such as external information.

Figure 7:
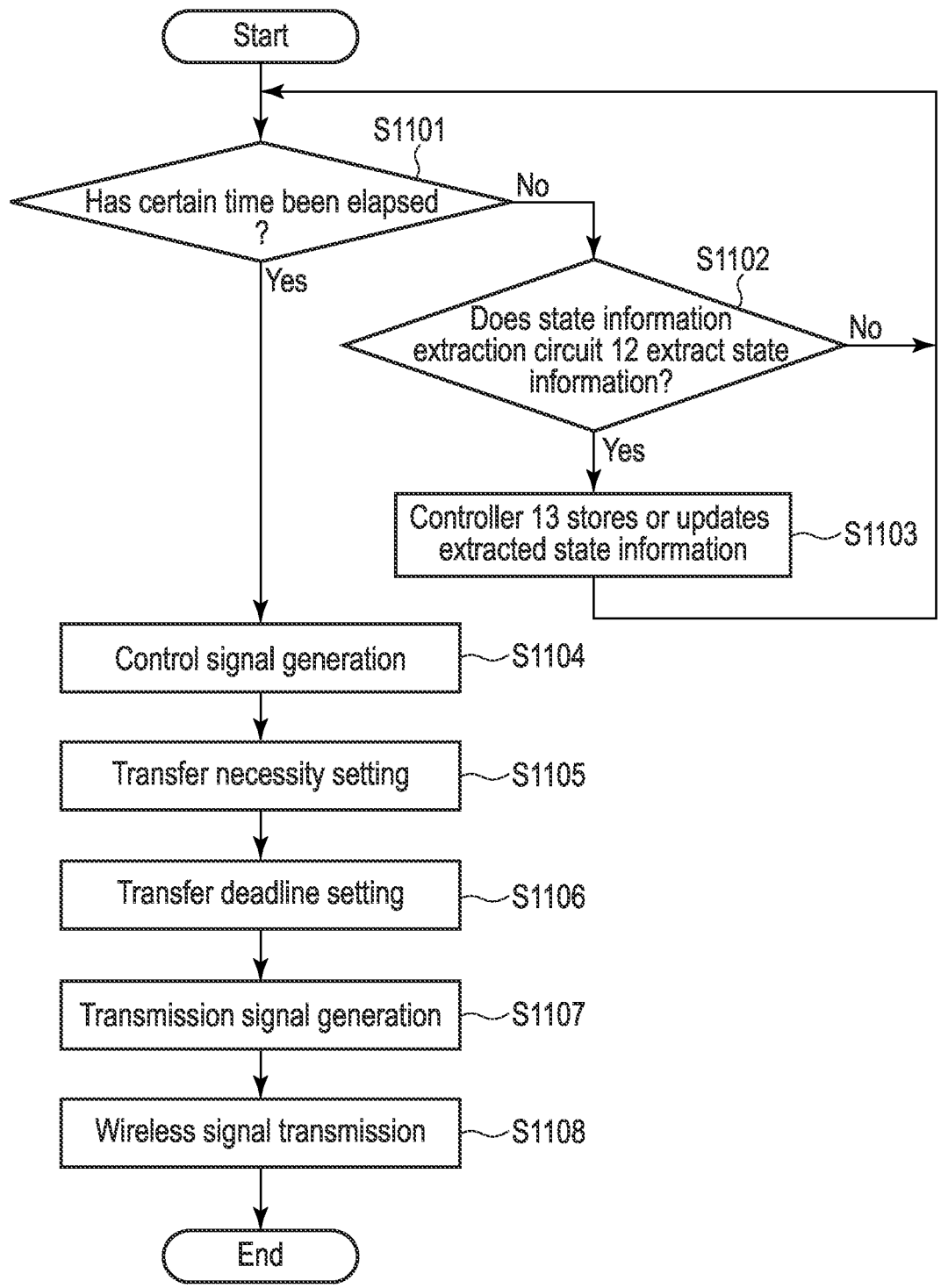
FIG. 7 is a flowchart illustrating an example of an operation of the wireless device according to the first embodiment.

FIG. 7 is a flowchart illustrating an example of an operation of the wireless device 1 according to the first embodiment.

In the wireless device 1, the controller 13 confirms the time information from the timer 18 to determine whether a certain time has been elapsed (step S1101). If the certain period has not been elapsed (No in step S1101), the controller 13 makes the transmitter/receiver 11 receive a wireless signal. The controller 13 determines whether the state information extraction circuit 12 extracts the state information (step S1102). When the state information extraction circuit 12 extracts the state information (Yes in step S1102), the controller 13 stores the extracted state information in a storage device (not illustrated) or updates the state information in the storage device if the state information of the motor 4 is stored in the storage device (step S1103).

If the certain period has been elapsed (Yes in step S1101), the controller 13 makes the control signal generator 14 generate the control signal (step S1104). The certain period in step S1101 is a period at which the wireless device 1 transmits the control signal by broadcast or the like, and may be the period T in FIG. 2, for example. In step S1101, the determination is not limited to whether or not the certain period has been elapsed and may be any determination, for example, determination as to whether the wireless device 1 receives a signal of an emergency button as the external information. When the state information extraction circuit 12 does not extract the state information (No in step S1102), the controller 13 determines whether the certain period has been elapsed again (step S1101).

The controller 13 makes the transfer necessity setting circuit 15 set the transfer necessity (step S1105). The controller 13 makes the transfer deadline setting circuit 16 set the transfer deadline (step S1106). The controller 13 makes the transmission signal generator 17 generate the transmission signal including the control signal and transfer information such as the transfer necessity and the transfer deadline (step S1107). The transmitter/receiver 11 transmits the transmission signal as a wireless signal (step S1108). The above procedure is repeated, and the controller 13 returns to step S1101 again and determines whether the certain period has been elapsed based on the time information of the timer 18.

FIG. 7 does not illustrate the entire flow, and merely illustrates an example. For example, when transfer is unnecessary for all wireless devices or when the transfer deadline is not set, in the processing of the transfer necessity setting circuit 15, the processing of the transfer deadline setting circuit 16 is not necessarily performed. The processing of the transfer necessity determination and the processing of the transfer period determination may be performed at the same time. Steps S1102 and S1103 of FIG. 7 are not necessarily performed when the wireless device 1 generates the transfer information without using the state information. At least one step may be skipped as necessary.

According to the first embodiment, when the wireless device 1 detects the transfer necessity target (referred to as a control target "A"), the wireless device 1 instructs at least one control target (referred to is a control target "B") other than the control target. "A" the transfer of the control signal to the control target "A" until a timing when the transfer is necessary, whereby desired control for the control target "A" can be performed. Retransmission of the control signal to the control target "A" can be reduced, and an unnecessary wireless signal is not transmitted. The control target "B" does not transmit the control signal to the control target "A" whose transfer deadline has passed but transmits the state signal of the control target "B" to the wireless device 1, and thus, a wireless signal transmission time can be shortened.

Second Embodiment

The second embodiment illustrates an example of the wireless device 3 that processes transfer information transmitted by the wireless device 1 illustrated in FIG. 5.

FIG. 8 illustrates a functional block diagram of the wireless device 3 according to the second embodiment.

The wireless device 3 include a transmitter/receiver 31, information extraction circuit 32, carrier sense circuit 33, controller 34, timer 35, driver 36, first transmission signal generator 37, and first transmission buffer group 38.

The transmitter/receiver 31 receives and demodulates a wireless signal, and outputs a demodulated reception signal to the information extraction circuit 32. The transmitter/receiver 31 adds data to a transmission signal input from the first transmission buffer group 38 as necessary for modulation, and transmits a modulated wireless signal. The transmitter/receiver 31 senses a reception signal level of the received wireless signal, outputs the signal level to the carrier sense circuit 33, and outputs busy/idle information from the carrier sense circuit 33 to the controller 34.

The information extraction circuit 32 extracts reception information such as control information from the reception signal input from the transmitter/receiver 31, and outputs the reception information to the controller 34.

The carrier sense circuit 33 compares the reception signal level input from the transmitter/receiver 31 and a predetermined level to perform a busy/idle determination, and outputs busy/idle information to the transmitter/receiver 31 and the controller 34.

The controller 34 receives the reception information from the information extraction circuit 32, the busy/idle information from the carrier sense circuit 33, time information from the timer 35, and state information from the driver 36. The controller 34 extracts a control signal from the reception information and outputs the control signal to the driver 36. The controller 34 periodically outputs a state information request signal to the driver 36 based on the time information and receives the state information. The controller 34 outputs the state information or the state information and the transfer information (information that needs to be transferred such as the transfer necessity, transfer deadline, and control information of a transfer destination) to the first transmission signal generator 37.

The timer 35 has time information and outputs the time information to the controller 34. The timer 35 may share the time information with the timer 18, and the timers 35 and 18 may be or are not necessarily synchronized in time.

The driver 36 receives the state information request signal from the controller 34 and outputs state information received from a control target to the controller 34. The driver 36 receives an input of the control signal from the controller 34 and controls the control target (motor 4) according to the control signal.

The first transmission signal generator 37 generates a first transmission signal from a state information input from the controller 34 or the state information and the transfer information, and outputs the first transmission signal to the first transmission buffer group 38.

The first transmission buffer group 38 buffers the first transmission signal input from the first transmission signal generator 37 and outputs the buffered first transmission signal to the transmitter/receiver 31.

FIG. 8 does not illustrate all constituent elements, and does not illustrate couplings among all blocks, but merely illustrates an example. The processing order described herein is not limited thereto. Information other than those described herein may be input and output. One block described herein may also have a function of another block.

Figure 9:
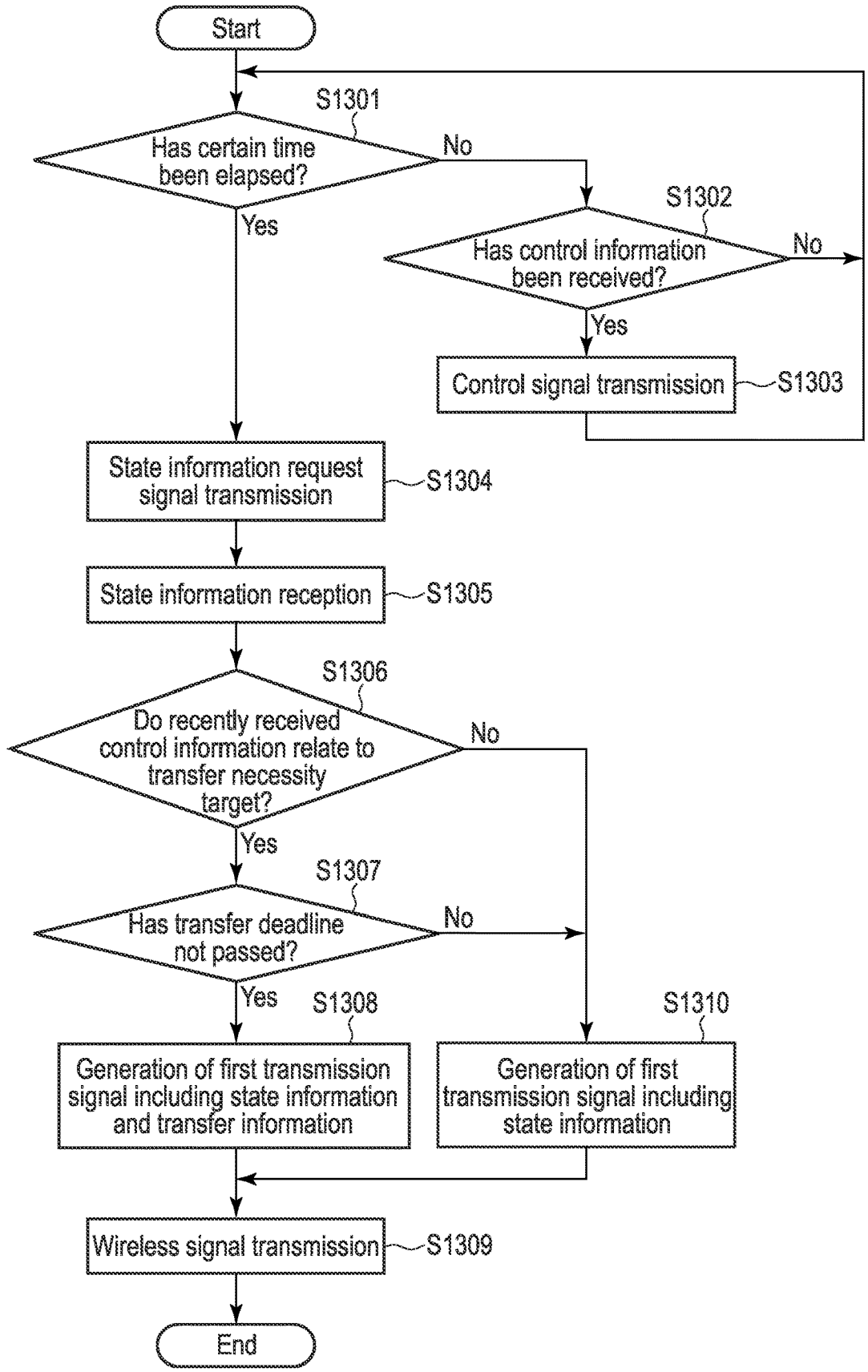
FIG. 9 is a flowchart illustrating an example of an operation of the wireless device according to the second embodiment.

FIG. 9 is a flowchart illustrating a processing example of the wireless device 3 according to the second embodiment.

In the wireless device 3, the controller 34 confirms the time information from the timer 35 to determine whether a certain time has been elapsed (step S1301). It the certain period has not been elapsed (No in step S1301, the controller 34 makes the transmitter/receiver 31 receive a wireless signal. The controller 34 determines whether the information extraction circuit 32 has received the control information (step S1302). When the information extraction circuit 32 receives the control information (Yes in step 31302). The controller 34 extracts the control signal from the control information, and transmits the control signal to the driver 36 (step S1303). When the information extraction circuit 32 has not received the control information (No in step S1302), the controller 35 determines again whether the certain time has been elapsed (step S1301).

The controller 34 transmits the state information request signal to the driver 36 (step S1304) when the certain period has elapsed (Yes in step S1301). Thereafter, the controller 34 receives the state information from the driver 36 (step S1305). After receiving the state information from the driver 36, the controller 34 determines whether the recently received control information relate to the transfer necessity target (step S1306). When the recently received control information do not relate to the transfer necessity target (No in step S1306), the controller 34 makes the first control signal generator 37 generate the first transmission signal including the state information (step S1310).

When the recently received control information relate to the transfer necessity target (Yes in step S1306), the controller 34 determines whether the transfer deadline has not passed (step S1307). When the transfer deadline has passed (No in step S1307), the controller 34 makes the first control signal generator 37 generate the first transmission signal including the state information (step S1310). When the transfer deadline has not passed (Yes in step S1307), the controller 34 makes the first control signal generator 37 generate the first transmission signal including the state information and transfer information (step S1308).

After step S1308 or S1310, the transmitter/receiver 31 transmits the first transmission signal as a wireless signal (step S1309). The above procedure is repeated, and the controller 34 returns to step S1301 again and determines whether the certain period has been elapsed based on the time information of the timer 35.

FIG. 9 does not illustrate the entire flow, and merely illustrates an example. For example, instead of using a lapse of the certain period as a trigger for the processing start, reception of the control signal from the wireless device may be used as the trigger to start the processing.

According to the second embodiment, when the wireless device 3 (referred to as a control target "B") detects that the control information addressed to a transfer necessity target (referred to as a control target "A"), the wireless device 3 simultaneously transmits the control signal addressed to another control target (corresponding to the control target "A") together with state information of the control target "B" until a timing when the transfer is necessary.

Accordingly, the wireless device 1 can perform desired control with respect to the control target "A" without retransmitting the control signal. The wireless device 3 does not have to separately transmit a wireless signal including the state information addressed to the wireless device 1 and a wireless signal including the control signal addressed to the control target "A". As a result, it is possible to replace wireless transmission of two packets required in a conventional art with wireless transmission of one packet.

Third Embodiment

The third embodiment illustrates an example wherein the wireless device 1 determines a transfer ID which is an ID of the transfer necessity target.

FIG. 10 illustrates a functional block diagram of a wireless device 1A according to the third embodiment. The wireless device 1A includes a transmitter/receiver 1301, state information extraction circuit 1302, controller 1303, control signal generator 1304, transfer necessity setting circuit 1305, transfer deadline setting circuit 1306, transmission signal generator 1307, and timer 1308. As compared with FIG. 5, the wireless device 1A further includes a transfer ID setting circuit 1309. Additional or changed portions as compared with FIG. 5 will be mainly described, only reference numerals are changed regarding functions without any description, and the functions are similar to those in FIG. 5. A wireless device 3A may have the same function as the wireless device 3 of FIG. 8 except for a portion related to the transfer ID setting circuit 1309 added in the third embodiment. Wireless devices 3A1 to 3A6 are connected to the motors 4-1 to 4-6, respectively. Each or both of the wireless device 3A1 to 3A6 and the motor 4-1 to 4-6 may be referred to as a control target.

The controller 1303 outputs transfer ID examination information to the transfer ID setting circuit 1309 and receives transfer ID from the transfer ID setting circuit 1309. The controller 1303 outputs the control signal, ID of the transfer necessity target, transfer deadline for the transfer necessity target, and transfer ID to the transmission signal generator 1307.

The transmission signal generator 1307 receives the control signal, ID of the transfer necessity target, transfer deadline for the transfer necessity target, and transfer ID from the controller 1303, generates a transmission signal, and outputs the transmission signal to the transmitter/receiver 1301.

The transfer ID setting circuit 1309 receives the transfer ID examination information from the controller 1303, determines a wireless device 3A to which the control signal needs to be transferred based on the transfer ID examination information, and outputs the transfer ID related to the transfer ID to the controller 1303 using the ID of the wireless device 3A as the transfer ID. That is, the transfer ID indicates the ID of the wireless device 3A as a transfer source. The transfer ID examination information may be, for example, a distance between the respective wireless devices 3A. The controller 1303 calculates the distance between the respective wireless devices 3A based on the state information.

For example, when a wireless device 3A (referred to as a wireless device "A") receives a control signal (referred to as a control signal "B") addressed to another wireless device 3A (referred to as a wireless device "B"), the wireless device "A" may confirm a transfer ID of the received control signal "B", and transfer the control signal "B" when the transfer ID coincides with an ID of the wireless device "A".

The transfer ID setting circuit 1309 may determine the transfer ID as follows, but there is no intention to limit conditions.

An ID of a control target (the motor 4 or the like) whose movement speed is low is determined as the transfer ID.

An ID of a wireless device 3A having good communication quality with a control target as a transfer destination (such as a wireless device 3A) or an ID of the motor 4 connected thereto is determined as the transfer ID.

Figures 14A, 14B, 14C:
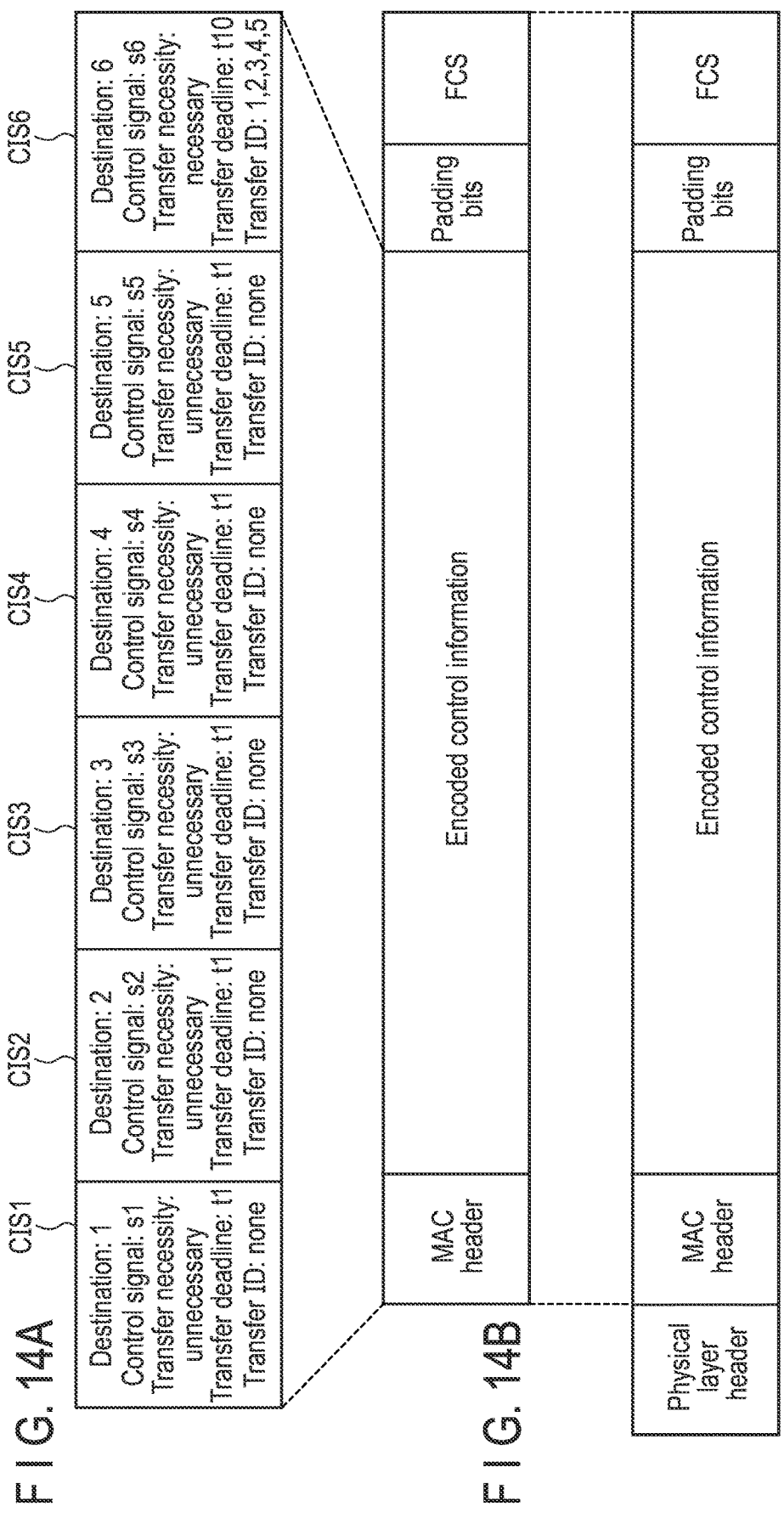
FIGS. 14A, 14B, and 14C illustrate an example of a data format of a transmission signal according to a fifth embodiment.

An ID of a control target (such as a wireless device 3A) that does not change a frame length even if transfer information is added to original information due to the number of padding bit in original frame (refer to FIGS. 14A, 14B, and 14C).

FIG. 11 is a view illustrating an example of the transfer ID examination information according to the third embodiment, and is an example of the distance between the respective wireless devices 3A1 to 3A6. The distance between the wireless device 3A1 and 3A2 is 10. A unit may be a centimeter (cm) or a meter (m), or other units may be used. The transfer ID setting circuit 1309 receives distance information as illustrated in FIG. 11 as the transfer ID examination information, and determines, for example, an ID of the wireless devisee 3A that is close to the transfer necessity wireless device 3A to which the control signal needs to be transferred as the transfer ID. For example, when a wireless device 3A6 is the transfer necessity wireless device 3A, the transfer ID setting circuit 1309 determines IDs of the wireless devices 3A5, 3A3, and 3A4 that are close to the transfer necessity wireless device 3A6 as the transfer IDs. In this manner, there may be one transfer ID or a plurality of transfer IDs.

As another example, the transfer ID examination information may be reception powers or packet error rates of each of the wireless devices 3A. A database may store data of the reception power or packet error rate measured in advance, or the database may be updated by appropriately performing measurement of the reception power or packet error rate during the operation of the system. For example, the transfer ID setting circuit 1309 may select the wireless device 3A having a large reception power when the reception power is used as the transfer ID examination information, and select the wireless device 3A having a small packet error rate when the packet error rate is used as the transfer ID examination information.

As another example, it is assumed that the wireless device 1A is located at different positions. The altitude of the wireless device 3A is used as the transfer ID examination information. The transfer ID setting circuit 1309 may select the wireless device 3A at a higher position based on the altitude. The controller 1303 calculates the altitude based on the state information or the like.

As another example, the transfer ID examination information may be a movement speed of each of the wireless devices 3A. The controller 1303 may calculate the movement speed based on the state information or the like, and select, for example, the wireless device 3A having the lowest movement speed. Alternatively, the transfer ID examination information may be a relative speed with the wireless device 3A. The controller 1303 may calculate the relative speed based on the state information or the like and select the wireless device 3A having the lowest relative speed. The embodiment is not limited to FIG. 11 and the above example, and these merely illustrate examples. Other transfer ID examination information may be used.

As described above, the wireless device 1A can appropriately determine the transfer ID, and can reduce unnecessary transfer while performing desired control.

Fourth Embodiment

The fourth embodiment illustrates an example in which the wireless device 1 determines a transfer deadline according to an air occupancy ratio.

FIG. 12 is a functional block diagram illustrating an example of a wireless device 1B according to the fourth embodiment. The wireless device 1B includes a transmitter/receiver 1401, state information extraction circuit 1402, controller 1403, control signal generator 1404, transfer necessity setting circuit 1405, transfer deadline setting circuit 1406, transmission signal generator 1407, timer 1408, and transfer ID setting circuit 1409. In FIG. 12, the wireless device 1B further includes a carrier sense circuit 1410 and an air occupancy ratio measurement circuit 1411 as compared with the wireless device 1A of FIG. 10. Additional or changed portions as compared with FIG. 10 will be mainly described, and portions without any description are similar to those in FIG. 10. A wireless device 3 is assumed to be the wireless device 3 of FIG. 8. The wireless devices 3-1 to 3-6 are connected to the motors 4-1 to 4-6, respectively. Each or both of the wireless devices 3-1 to 3-6 and the motors 4-1 to 4-6 may be referred to as a control target.

The transmitter/receiver 1401 outputs a signal level of a received wireless signal to the carrier sense circuit 1410 and receives busy/idle information from the carrier sense circuit 1410.

The carrier sense circuit 1410 receives a signal level of the received wireless signal from the transmitter/receiver 1401, compares the received signal level with a predetermined level (threshold), performs a busy/idle determination, and outputs the resulting busy/idle information to the transmitter/receiver 1401 and the controller 1403.

The controller 1403 receives the busy/idle information from the carrier sense circuit 1410, outputs the busy/idle information to the air occupancy ratio measurement circuit 1411, and receives an air occupancy ratio from the air occupancy ratio measurement circuit 1411.

The air occupancy ratio measurement circuit 1411 calculates the air occupancy ratio based on the busy/idle information input from the controller 1403, and outputs the calculated air occupancy ratio to the controller 1403. The air occupancy ratio is a ratio of a busy time in a frequency band to be used. For example, assuming that a measurement time is $T_{calc}$, a busy time in the measurement time is $t_{busy}$, and an idle time in the measurement time is $t_{idle}$, an air occupancy ratio $P_{busy}$ is expressed by the following formula.

$$P_{busy} = t_{busy}/T_{calc} = t_{busy}/(t_{busy} + t_{idle})$$

The measurement time may be a time set in the air occupancy ratio measurement circuit 1411 in advance, or may be set by the controller 1403. The air occupancy ratio may be periodically measured at a period set in advance by the air occupancy ratio measurement circuit 1411, or at a timing determined by the controller 1403.

The transfer deadline setting circuit 1406 receives the air occupancy ratio. The transfer deadline setting circuit 1406 inputs the air occupancy ratio, an ID of the transfer necessity target, and a period of the control target, determines a transfer deadline for the transfer necessity target, and outputs the transfer deadline for the transfer necessity target to the controller 1403. Hereinafter, a process of determining the transfer deadline for the transfer necessity target in the transfer deadline setting circuit 1406 will be described.

FIG. 13 is a view illustrating an example of a relationship between the air occupancy ratio and the transfer deadline according to the fourth embodiment, and is a setting example of the transfer deadline in a case where control periods of six control targets 3-1 to 3-6 are all T. The transfer deadline setting circuit 1406 ray store data of FIG. 13 in a storage device (not illustrated) or the like in advance, and determine the transfer deadline according to the relationship of FIG. 13 from the number of the transfer necessity targets and the air occupancy ratio. FIG. 13 is an example of a case where the transfer deadline is set to be shorter as the number of the transfer necessity targets is larger and the transfer deadline is set to be shorter as the air occupancy ratio is higher.

It is illustrated that, for example, when the number of the transfer necessity targets is "3", the transfer deadline setting circuit 1406 sets the transfer deadline for the transfer necessity target as T in a case where the air occupancy ratio is "equal to or more than 0 and less than 0.7", and sets the transfer deadline for the transfer necessity target as T/2 in a case where the air occupancy ratio is "equal to or more than 0.7 and less than 0.8".

It is illustrated that, for example, when the air occupancy ratio is "equal to or more than 0.5 and less than 0.7", the transfer deadline setting circuit 1406 sets the transfer deadline for the transfer necessity target as T in a case where the number of the transfer necessity targets is 1, 2, or 3, and sets the transfer deadline for the transfer necessity target as T/2 in a case where the number of the transfer necessity targets is 4, 5, or 6.

For example, in FIG. 13, the transfer deadline "0" means that transfer is not performed. The controller 1403 may output control information including the transfer deadline "0" to the transmission signal generator 1407, or output control information, from which the transfer deadline related to the transfer necessity target is excluded, to the transmission signal generator 1407.

In FIG. 13, for example, when the number of the transfer necessity targets is four and the air occupancy ratio is 0.75, the transfer deadline is "0". The transfer deadline "0" is set for all the transfer necessity targets. In this case, three transfer necessity targets among four may be selected, the deadlines of the selected three targets may be set to T/2, and the deadline of the remaining one target may be set to "0" instead of setting the transfer deadline "0" for all the transfer necessity targets. The transfer necessity target may be selected according to a priority set in advance, or may be selected according to a transfer priority by determining the transfer priority in addition to the transfer necessity in the transfer necessity setting circuit 1405.

Regarding a method of determining the transfer priority in the transfer necessity setting circuit 1405, for example, a wireless device 3 having a low reception level of received wireless signal from the other wireless devices 3 may be prioritized. A distance between the wireless device 1B and each of the wireless devices 3 may be calculated to prioritize the wireless device 3 having a long distance. The priority may be determined from a processing content obtained from external information.

The above example is an example related to the setting of the transfer deadline when the control periods are all T, but different control periods may be mixed. In such a case, each correspondence relationship as illustrated in FIG. 13 may be set using a combination of the number of the transfer necessity targets having different control periods, and the transfer deadline may be set according to the correspondence relationship.

FIG. 12 does not represent all constituent elements, and does not illustrate couplings among all blocks, but merely illustrates an example. The processing order described herein is not limited thereto. Information other than those described herein may be input and output. One block described herein may also have a function of another block.

According to the fourth embodiment, the wireless device 1B can appropriately determine the transfer deadline according to the air occupancy ratio, and can reduce unnecessary transfer while performing desired control for the operation of the robot arm device 2.

Fifth Embodiment

The fifth embodiment illustrates an example of a protocol when the wireless device 1 transmits control information and transfer information.

FIGS. 14A, 14B, and 14C illustrate conceptual views of data processing examples performed by the wireless device 1 according to the fifth embodiment. Hereinafter, description will be given using the wireless device 1B of FIG. 12 and the wireless device 3 of FIG. 8.

FIG. 14A illustrates processing of an upper layer by the transmission signal generator 1407 of the wireless device 1B. FIG. 14B illustrates processing of a medium access control (MAC) layer by the transmitter/receiver 1401. FIG. 14C illustrates processing of a physical layer by the transmitter/receiver 1401. The upper layer is a layer higher than the MAC layer, and may be an application layer, for example. If the upper layer of the wireless device 18 and the upper layer of the wireless device 3 are set to the same protocol in advance, the meaning of a signal transmitted and received between the upper layers can be mutually interpreted. Even if the MAC layer and the physical layer are in wireless LANs, a signal can be transmitted and received between the upper layers. Even if local 5G or ZigBee (registered trademark) other than wireless LAN is used, a signal can be transmitted and received between the upper layers.

FIG. 14A illustrates control information CIS1 to CIS6 output from the transmission signal generator 1407 of the wireless device 1B. Each of the control information CIS1 to CIS6 includes control information of the wireless devices 3-1 to 3-6. Each of the control information CIS1 to CIS6 may be referred to as control information CIS when being not individually distinguished.

Each of the control information CIS1 to CIS6 includes a destination of the control target (an ID of the wireless device 3, ID of the motor 4, or the like), control signal, and transfer information. The transfer information includes the transfer necessity, transfer deadline, and transfer ID. The transmission signal generator 1407 generates the control information CIS1 to CIS6 as upper layer data. FIG. 14A is an example of a case in which there are control information for six control targets. The transmission signal generator 1407 outputs the generated the control information CIS1 to CIS6 to the transmitter/receiver 1401.

FIG. 14B illustrates data of the MAC layer. The transmitter/receiver 1401 encodes the received control information CIS1 to CIS6 as a process of the MAC layer, and adds a MAC layer header, padding bits, and a frame check sequence (FCS) to the encoded control information. The MAC layer header includes a destination of the encoded control information and also includes information such as broadcast and unicast. Regarding the padding, when a payload is modulated in units of OFDM symbols as in a wireless LAN, the number of bits to be transmitted is a constant multiple of the number of bits to be sent in units of OFDM symbols. When the number of bits of the encoded control information does not coincide with the constant multiple of the number of bits in units of OFDM symbols, it is necessary to add an unnecessary bit for coincidence. Such addition of the bit may be referred to as a padding. The FCS is a bit sequence that is added to confirm whether bits of the control information obtained by demodulation and decoding on the reception side, are correct. Bits of the encoded control information, the padding, and the FCS may be interleaved or scrambled.

As physical layer processing, the transmitter/receiver 1401 converts a baseband signal, generated by adding the physical layer header to bits generated in the MAC layer, into an RF signal, and outputs the RF signal as a wireless signal. FIGS. 14A, 14B, and 14C are not limited to these, but merely illustrate examples.

FIG. 15 is a flowchart illustrating a processing example of the wireless device 1 according to the fifth embodiment.

The transmission signal generator 1407 or the transmitter/receiver 1401 of the wireless device 1B receives necessary information (step S1501). The necessary information may include the control target, control signal of the control target, transfer necessity, transfer deadline, and transfer ID.

The transmission signal generator 1407 generates the control information. CIS1 to CIS6 for an upper layer when receiving the necessary information (step S1502). When the control information CIS1 to CIS6 include at least one control information including the transfer necessity "necessary" (Yes in step S1503), the transmitter/receiver 1401 generates a broadcast MAC layer signal step S1504). When the control information CIS1 to CIS6 do not include control information including the transfer necessity "necessary" (Ho in step S1503), the transmitter/receiver 1401 generates a unicast MAC layer signal (step S1505). The transmitter/receiver 1401 generates a physical layer signal based on the generated MAC layer signal (step S1506). The transmitter/receiver 1401 generates and transmits a wireless signal (step S1507). The transmission signal generator 1407 or the transmitter/receiver 1401 of the wireless device 1B repeats the above processes.

FIG. 15 does not illustrate the entire flow, and merely illustrates an example. For example, a multicast MAC layer signal may be generated instead of generating the broadcast MAC layer signal. The broadcast MAC layer signal may be generated even if the control information CIS1 to CIS6 do not include control information including the transfer necessity "necessary".

According to the fifth embodiment, the wireless device 1B can communicate the control information and the transfer necessity with the wireless device 3 without being limited to the protocols of the MAC layer and the physical layer, and can reduce unnecessary transfer while performing desired control.

Sixth Embodiment

The sixth embodiment illustrates an example of a case where the wireless device 3 transfers the control signal in consideration of a transmission timing by carrier sense (CSMA/CA).

FIG. 16 is a functional block diagram illustrating an example of a wireless device 3C according to the sixth embodiment. The wireless device 3C of FIG. 16 further includes a second transmission signal generator 3609, second transmission buffer group 3610, and transmission buffer selector 3611 as compared with the wireless device 3 of FIG. B. Additional or changed portions as compared with FIG. 8 will be mainly described, only reference numerals are changed regarding functions without any description, and the functions are similar to those in FIG. 8.

The controller 3604 outputs a state information request signal to a driver 3606 at any timing, such as periodically or at a timing when a control information is received based on time information, and receives state information. The controller 3604 outputs the state information and transfer information to a first transmission signal generator 3607, and outputs the state information to the second transmission signal generator 3609. More specifically, when information input, from a carrier sense circuit 3603 is idle at a transmission timing of a wireless signal (no wireless signal is received), the controller 3604 confirms the transfer deadline included in transfer information input from an information extraction circuit 3602 and the time information of a timer 3605. When having confirmed that the time information input from the timer 3605 is within the transfer deadline, the controller 3604 outputs a selection signal for selecting a first transmission buffer group 3608 to the transmission buffer selector 3611.

On the other hand, the controller 3604 similarly confirms the transfer deadline and time information and outputs a selection signal for selecting the second transmission buffer group 3610 to the transmission buffer selector 3611 when the transfer deadline has passed.

The first transmission signal generator 3607 generates a first transmission signal based on the state information and transfer information input from the controller 3604, and outputs the first transmission signal to the first transmission buffer group 3608.

The second transmission signal generator 3609 generates a second transmission signal based on the state information input from the controller 3604, and outputs the second transmission signal to the second transmission buffer group 3610.

The first transmission buffer group 3608 buffers the first transmission signal input from the first transmission signal generator 3607, and outputs the buffered first transmission signal to the transmission buffer selector 3611.

The second transmission buffer group 3610 buffers the second transmission signal input from the second transmission signal generator 3609, and outputs the buffered second transmission signal to the transmission buffer selector 3611.

The transmission buffer selector 3611 receives the selection signal from the controller 3604, selects one transmission signal from the first or second transmission buffer group 3610 according to the selection signal, and outputs the selected transmission signal to a transmitter/receiver 3601. The transmitter/receiver 3601 outputs the input transmission signal as a wireless signal.

FIG. 16 does not represent all constituent elements, and does not illustrate couplings among all blocks, but merely illustrates an example. The processing order described herein is not limited thereto. Information other than those described herein may be input and output. One block described herein may also have a function of another block.

According to the sixth embodiment, when the wireless device 3C receives a control signal addressed to another wireless device 3C for which the transfer necessity is "necessary", the wireless device 3C can transfer the control signal in consideration of the transfer deadline even in a case where the transmission timing of the wireless signal is delayed due to the carrier sense (CSMA/CA) by the carrier sense circuit 3603 before transmission and the transfer deadline has passed. That is, the control signal addressed to another control target can be transmitted simultaneously with the state information until a timing when the transfer of the control signal is necessary. Accordingly, wireless devices 1, 1A, and 1B can perform desired control, and perform wireless transmission of one packet instead wireless transmission of two packets required in a conventional art.

Seventh Embodiment

A description will be given regarding an example in which a state signal transmitted by the wireless device 3 is transferred to another wireless device 3 with reference to FIGS. 2, 17A, 17B, and 17C.

Matters not described herein are similar to those in the first embodiment to the sixth embodiment. Although the wireless device 3 of FIG. 8 is given as an example, other wireless devices may be used. A wireless device 1 is given as an example, but other configurations may be adopted.

Figure 17A:
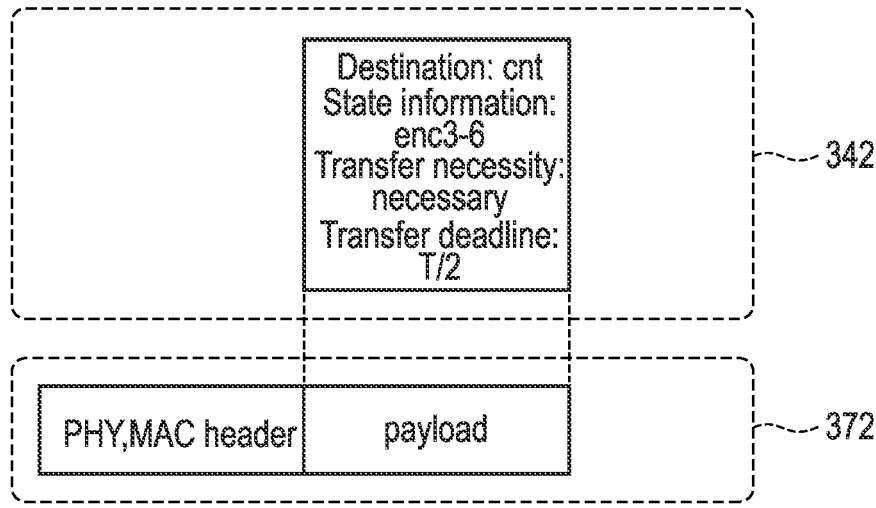
FIGS. 17A, 17B, and 17C illustrate an example of a data format of a transmission signal according to a seventh embodiment.
Figure 17B:
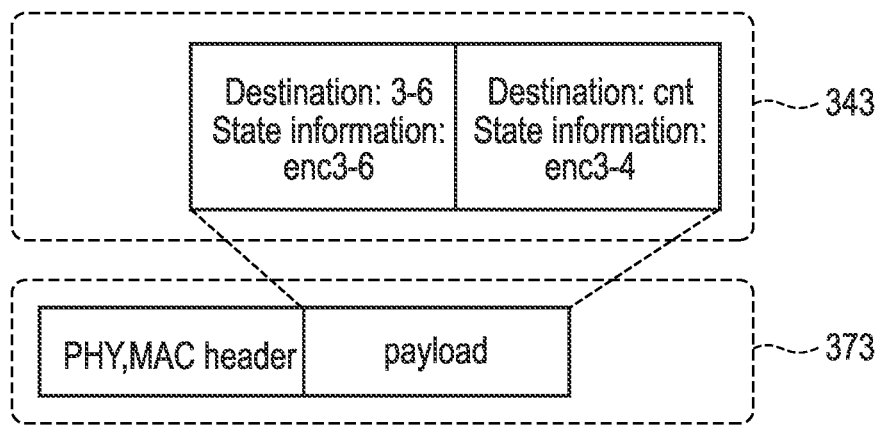
Figure 17C:
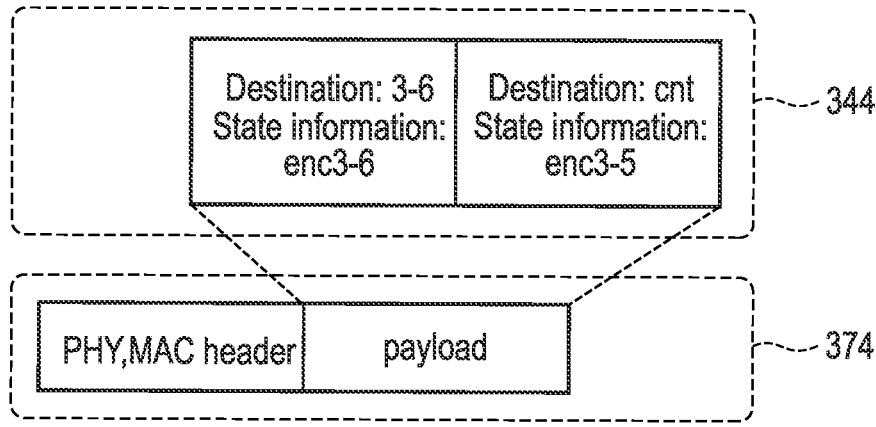

FIGS. 17A, 17B, and 17C are examples of data formats of transmission signals transmitted by a wireless device 3 according to the seventh embodiment. FIG. 17A illustrates a transmission signal of the wireless device 3-6. FIG. 17B illustrates a transmission signal of the wireless device 3-4. FIG. 17C illustrates a transmission signal of the wireless device 3-5.

As illustrated in FIG. 17A, when the wireless device 3-6 transmits own state information "enc3-6" to the wireless device 1 (destination "cnt"), the wireless device 3-6 generates data 342 including state information with transfer necessity "necessary" and transfer deadline "T/2" in order to transfer the state information, and transmits a transmission signal 372 (TC5 in FIG. 2) added with various headers including the data 342 in a payload by broadcast.

As illustrated in FIG. 17B, when the wireless device 3-4 transmits own state information "enc3-4" to the wireless device 1 (destination "cnt"), the wireless device 3-4 generates a transmission signal 373 by adding various headers to a payload including data 343, and transmits the transmission signal 373 (TC7 in FIG. 7). The data 343 includes the state information "enc3-6" received from the wireless device 3-6 and the state information "enc3-4" of the wireless device 3-4.

As shown in FIG. 17C, when the wireless device 3-5 transmits own state information "enc3-5", the wireless device 3-5 generates a transmission signal 374 by adding various headers to a payload including data 344, and transmits the transmission signal 374 (TC8 in FIG. 2). The data 344 includes the state information "enc3-6" received from the wireless device 3-6 and the state information "enc3-5" of the wireless device 3-5.

When the wireless device 3-6 receives a message instructing transfer from the wireless device 1, the wireless device 3-6 may transfer the message to another wireless device 3. When the wireless device 3-6 receives a control signal of own device from another wireless device (referred to as a wireless device "A"), the wireless device 3-6 may transfer the control signal to the wireless device "A". When the wireless device 3-6 receives a control signal of own device from another wireless device, the wireless device 3-6 may transfer the control signal to all the other wireless devices 3-1 to 3-5.

The wireless device 3-6 may set, as the transfer deadline, a value based on a message from the wireless device 1 and related to the transfer deadline. The wireless device 3-6 may set, as the transfer deadline, a transfer deadline set in the control signal of own device received from other wireless devices 3. That is, the wireless device 1 sets the transfer necessity and the transfer deadline for the wireless device 3, and the wireless device 3 generates the data illustrated in FIGS. 12A, 17B, and 17C according to the information set by the wireless device 1.

According to the seventh embodiment, the state information to be transmitted from the wireless device 3 to the wireless device 1 can be transferred to another wireless device 3. Accordingly, the state information of the wireless device 3 can be received by the wireless device 1 at a high probability, and the wireless device 1 can perform desired control and perform wireless transmission of one packet instead wireless transmission of two or more packets which required in a conventional art.

Eighth Embodiment

In the eighth embodiment, reliability of transfer is enhanced without increasing an air occupancy ratio by utilizing a padding bit area.

Matters not described herein may be configured to be similar to those of the first embodiment to the seventh embodiment. The wireless device 1 and wireless device 3 will be described as examples, but other configurations may be adopted.

The paddings performed in the MAC layers of FIGS. 14A, 14B, and 14C are usually performed using predetermined binary, for example, all 0*b* (all "0").

There is a case where wireless frame lengths become exactly the same between a case where the wireless device 3 transmits the state information to the wireless device 1 and a case where the wireless device 3 transmits the state information and transfer information addressed to another wireless device 3. Details will be described hereinafter.

When communication is performed at a transmission rate of 54 Mbps in accordance with the standard of IEEE802.11a of a wireless LAN, one OFDM symbol includes 216 bits. Since transfer is performed in units of OFDM symbols, when n symbols are transmitted, the number of bits to be transmitted is 216×n (n is a natural number).

It is assumed that the state information to be transmitted by the wireless device 3 to the wireless device 1 requires, for example, 288 bits. The 288 bits correspond to an example of the number of bits including not only pure state information but also various pieces of information necessary for normal communication, such as a tail bit. The transmission of the 288 bits requires two OFDM symbols, but 216×2−288=144 bits remain, and thus, 144 padding bits are added. On the other hand, in the "case where the state information and transfer information addressed to another wireless device 3 are transmitted", for example, it is assumed that 64 bits are required in addition to the 288 bits. Even in this case, the transmission requires only two OFDM symbols, and 216× 2−(288+64)=80 bits remain, and thus, 80 padding bits are added.

As described above, even in the "case where the state information and transfer information addressed to another wireless device 3 are transmitted", the same two OFDM symbols as that in "the case where the wireless device 3 transmits state information to the wireless device 1" are transmitted. Therefore, the wireless frame lengths are exactly the same, and the air occupancy ratio can be made the same. In the above-described manner, the reliability of control signal transmission can be enhanced without increasing the air occupancy ratio. When the wireless device 3 confirms the wireless frame lengths and determines that the wireless frame lengths in the two cases are the same, the wireless device 3 may transmit the transfer information addressed to the another wireless device 3 even if the transfer deadline has passed or the other wireless device 3 is not included in the transfer ID. The wireless device 3 may transfer a whole or a part of the control information addressed to another control target (the motor 4 or the like) within a range where the wireless frame length does not lengthen. When a part of the control information is transferred, the wireless device 3 may transfer the control information from the beginning or from the middle.

According to the eighth embodiment, the reliability of transfer can be enhanced without increasing the air occupancy ratio by utilizing the padding bit area.

Ninth Embodiment

The ninth embodiment illustrates an example of a method of determining the transfer information such as the transfer necessity, transfer deadline, and transfer ID to be included in control information.

According to the ninth embodiment, the transfer necessity setting circuit 15, transfer deadline setting circuit 16, and transfer ID setting circuit 1309 are illustrated as examples, but other configurations may be adopted.

Figure 18:
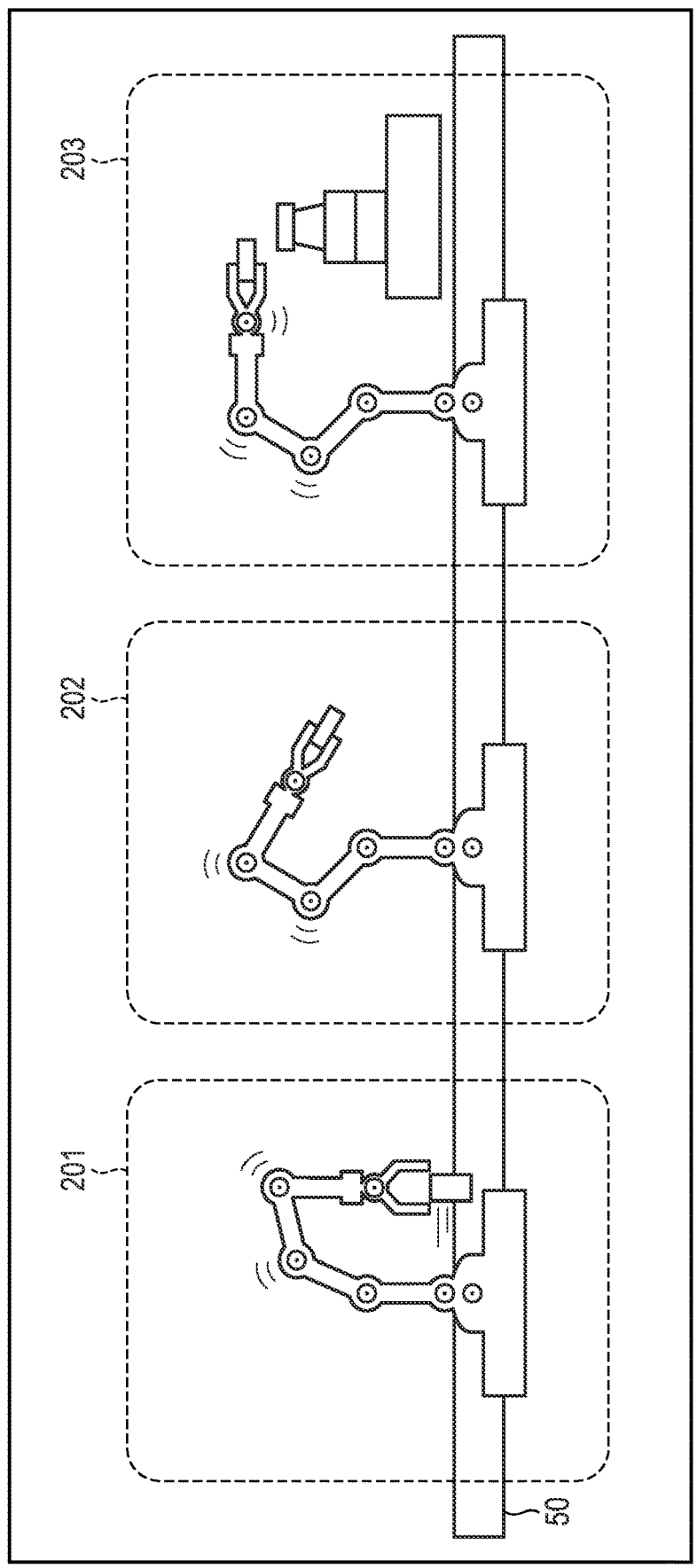
FIG. 18 illustrates a first example of a wireless control system according to a ninth embodiment.

FIG. 18 is a first view illustrating a situation example that is considered when the wireless device 1 according to the ninth embodiment generates the transfer information.

In an example 201, the robot arm device 2 is made grip an item flowing on a belt conveyor 50. It is necessary to operate the moving arms 22 or the axis of the motor 4 with a high accuracy. Therefore, it is necessary to enhance reliability of transmission regarding a control signal of a control target (the motor 4) that affects the moving arms 22, and the transfer necessity setting circuit 15 may set the transfer necessity as "necessary" for this control target. The transfer deadline setting circuit 16 may calculate a transfer deadline based on a speed of the belt conveyor 50 or the like.

In an example 202, the robot arm device 2 is caused to move an item. It is often unnecessary to operate the arms 22 or the axis of the motor 4 with a high accuracy. Therefore, the transfer necessity setting circuit 15 may set the transfer necessity as "unnecessary" for a control target that affects the moving arms 22.

In an example 203, an item is placed at a spot that is hardly stable, such as on a small object, with respect to the robot arm device 2. It is necessary to operate the moving arms 22 or the axis of the motor 4 with a high accuracy. Therefore, the transfer necessity setting circuit 15 may set the transfer necessity as "necessary" for a control target (the motor 4 or the like) that affects the moving arms 22. The transfer deadline setting circuit 16 may calculate a transfer deadline based on work efficiency of the robot arm device 2 and the like.

The transfer ID setting circuit 1309 may set IDs of all wireless devices 3 in the system 100 as the transfer TDs, or may measure the altitude of the axis of each control target (motor 4) from the state information and set an ID of the wireless device 3 connected to the motor 4 at the highest position as the transfer ID. The transfer ID setting circuit 1309 may measure a movement of the axis of each control target (motor 4) from the state information, and set an ID of the wireless device 3 connected to the motor 4 with movement smaller than a threshold as the transfer ID. The transfer ID setting circuit 1309 may measure a position of the axis of each control target (motor 4) from the state information, and set an ID of the wireless device 3 on the line of sight (LOS) of the wireless device 3 to which the control information needs to be transferred and the wireless device 1 as the transfer ID.

Figure 19:
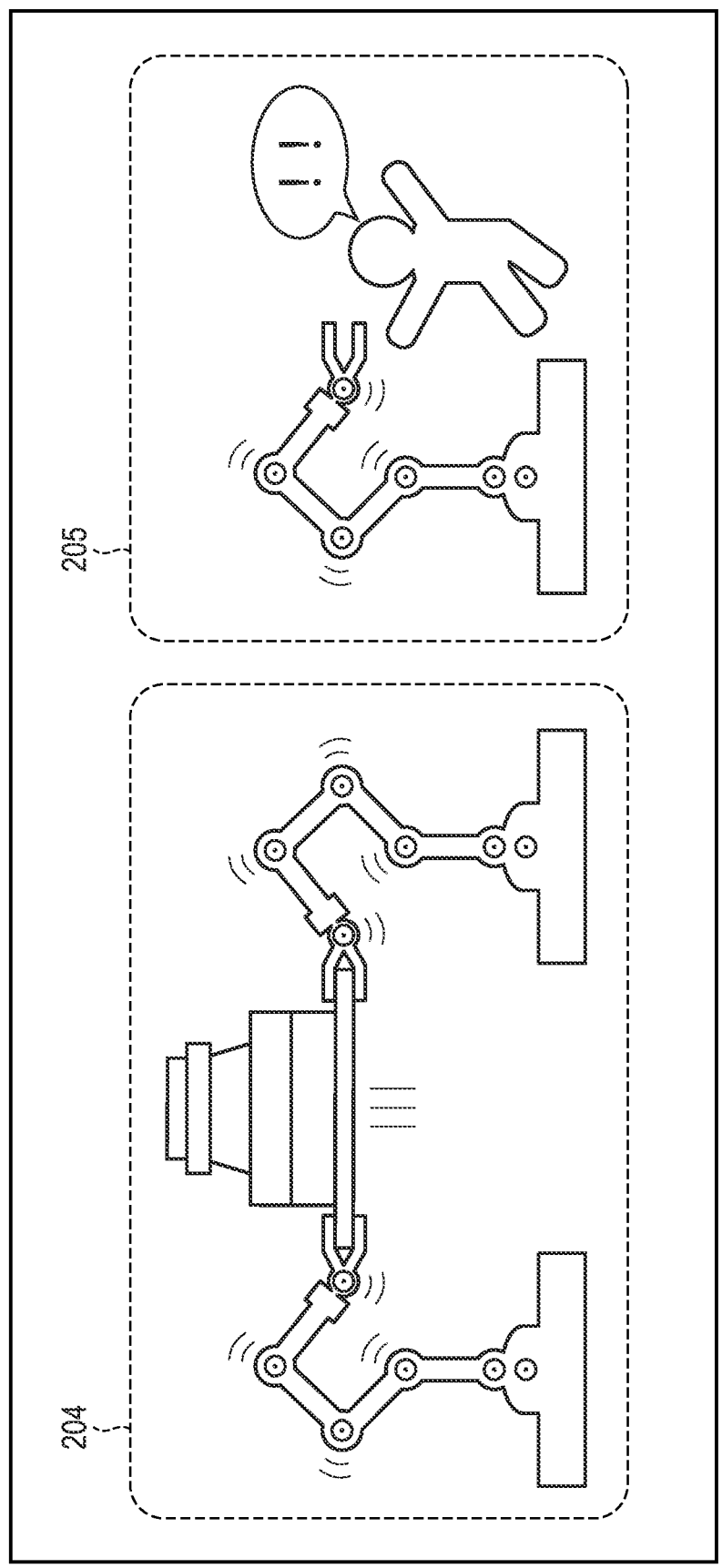
FIG. 19 illustrates a second example of a wireless control system according to the ninth embodiment.

FIG. 19 is a second view illustrating a situation example when the wireless device 1 according to the ninth embodiment generates the transfer information.

In an example 204, a load is palletized with respect to the two robot arm devices 2. The arms 22 of the two robot arm devices 2 (FIG. 1) or the axes of the motors 4 need to be synchronized and operated with a high accuracy so as not to lose the balance of the load. Therefore, it is necessary to enhance reliability of transmission regarding the control signal for a control target (the motor 4) that affects the moving arms 22. The transfer necessity setting circuit 15 may determine the transfer necessity as "necessary" for this control target. The transfer deadline setting circuit 16 may calculate a transfer deadline based on a situation of the load or the like such that the load does not slip and fall. The situation of the load or the like may be monitored with a camera, or may be detected by the wireless device 1 or the like from the state information output from the two robot arm devices 2.

In in example 205, the robot arm device 2 is urgently stopped, for example, when a person approaches the operating robot arm device 2. It is necessary to transmit the control information indicating a stop instruction to all control targets at a high speed. It is necessary to enhance reliability of transmission regarding the control signal for all the control targets (motor 4). The transfer necessity setting circuit 15 may determine the transfer necessity as "necessary" for all the control targets regardless of the state information thereof. The transfer deadline setting circuit 16 may set a transfer deadline to such a long time that all the control target can be hoped, or may set an infinite transfer deadline, that is, does not necessarily set the transfer deadline. When all the wireless devices 3 receives a control information of another wireless device 3, all the wireless devices 3 must transfer the control information of the other wireless device 3.

Through the above procedure, it is possible to determine the transfer information, such as the transfer necessity, transfer deadline, and transfer ID, to be included in the control information in consideration of various situations. The above examples are not intended to be limited thereto, and various examples may be assumed, and any method such as replacement or combination of the above examples may be adopted.

Tenth Embodiment

The tenth embodiment illustrates an example in which transmission is performed by unicast from the wireless device 1 to three wireless devices 3. However, a transmission method according to the tenth embodiment is rot limited to unicast, broadcast, multicast, and the like can be also used. The number of transmission destination devices 3 is not limited to three, and two or four or more devices 3 can be used.

FIG. 20 is a conceptual diagram of a wireless control system 1000 according to the tenth embodiment. The wireless control system 1000 includes a wireless device 1D and a robot arm device 2D. As compared with FIG. 1, three motors 4D-1, 4D-2, and 4D-3 are mounted on the robot arm device 2D, and three wireless devices 3D-1, 3D-2, and 3D-3 are connected to the motors 4D-1 to 4D-3, respectively. Each of the motors 4D-1 to 4D-3 may be referred to as a motor 4D when being not individually distinguished. Each of the wireless devices 3D-1 to 3D-3 may be referred to as a wireless device 3D when being not individually distinguished. The wireless device 1D transmits a wireless signal to the wireless devices 3D by unicast. The wireless devices 3D may perform transmission to the wireless device 1D by unicast, or by multicast or broadcast. Hereinafter, an example where the wireless devices 3D also performs transmission by unicast will be described. Functions with the same names as the functions described in the drawings of the above embodiments will be changed only in reference numerals, and will not be described here.

FIG. 21 illustrates a functional block diagram of the wireless device 1D according to the tenth embodiment. The wireless device 1D includes a transmitter/receiver 1D01, state information extraction circuit 1D02, controller 1D03, control signal generator 1D04, transfer necessity setting circuit 1D05, sequence number (SN) determining circuit 1D06, transmission signal generator 1D07, and timer 1D08. As compared with FIG. 5, the wireless device 10 includes the SN determining circuit 1D06 instead of the transfer deadline setting circuit 16. Here, additional or changed portions as compared with FIG. 5 will be mainly described, only reference numerals are changed regarding functions without any description, and the functions are similar to those in FIG. 5.

The state information extraction circuit 1002 extracts IDs, state information, and SNs of one or more wireless devices 3D from a reception signal input from the transmitter/receiver 1D01, and outputs the state information and the SN to the controller 1D03.

The controller 1D03 may store the received state information of each of the wireless devices 3D in a storage device (not illustrated) or update the already stored state information and SN. The controller 1D03 may also include a program and the like executed by a computer or the like that has a data processing function such as a CPU and a memory. The controller 1D03 receives the state information and SNs of one or more wireless devices 3D from the state information extraction circuit 1D02, and receives external information from the outside of the wireless device 10. The controller 1D03 receives time information from the timer 1D08.

The controller 1D03 periodically outputs the state information to the control signal generator 1D04 based on the time information, outputs a target value calculated based on a program incorporated in advance or the external information, and receives a control signal from the control signal generator 1D04. The target value is, for example, an assumed value of the next state of the robot arm device 2D, and may be an encoder value (set parameter) that needs to be set next for the motor 4D. The controller 1D03 may generate the next control signal based on the target value.

Next, the controller 1D03 outputs a control period, control signal, target value, or state information to the transfer necessity setting circuit 1D05, and receives an ID of the transfer necessity target from the transfer necessity setting circuit 1D05. Next, the controller 1D03 outputs the ID of the transfer necessity target to the SN determining circuit 1D06, and receives an SN for the transfer necessity target from the SN determining circuit 1D06. Next, the controller 1D03 outputs the control signal, ID of the transfer necessity target, and the SN for the transfer necessity target to the transmission signal generator 1D07.

The SN determining circuit 1D06 receives the ID of the transfer necessity target from the controller 1D03 and outputs the SN for the transfer necessity target to the controller 1D03. The SN may be a value based on the time input from the timer 1D08. For example, the wireless device 1D and each of the wireless devices 3D are synchronized in time and share the SN and a time conversion method, so that each of the wireless devices 3D can acquire time when the wireless device 1D assigned an SN for the transfer necessity target. A value of the SN may be set by the wireless device 1D for each control target, or may be one common value for all the wireless devices 3D. For example, the wireless device 1D may determine a different SN for each control target and increment a value of each SN. Each of the wireless devices 3D may assign different SN to own state information.

For example, a value of the SN may be incremented every time the state information is transmitted. Different SNs may be assigned even if communication is performed at the same time by making timings for starting communication, communication periods, and communication frequencies of the wireless device 1D and respective wireless devices 3D different. The wireless device 1D generating the control signal or wireless device 3D receiving the state information from the driver 3D06 sets a value of the SN. The wireless device 3D which is a destination of the transferred control signal does not change the value of the SN.

The SN may be an integer representing a generation order of the control signals of the respective wireless devices 3D. For example, "1" is set to the SN of the control signal of the wireless device 3D-1 which is generated first and "2" is set to the SN of the control signal of the wireless device 3D-1 which is generated next.

FIGS. 22A, 22B, and 22C illustrate conceptual views of an example of data processing performed by the wireless device 1D according to the tenth embodiment. Here, added or changed portions as compared with FIGS. 14A, 14E, and 14C will be mainly described, and functions, items, and the like without any description are changed only in reference numerals and may have the contents similar to those in FIGS. 14A, 14B, and 14C.

FIG. 22A illustrates processing of an upper layer by the transmission signal generator 1D07 of the wireless device 1D. FIG. 22B illustrates processing of a MAC layer by the transmitter/receiver 1D01. FIG. 22C illustrates processing of a physical layer by the transmitter/receiver 1D01.

FIG. 22A illustrates control information CIS1 output by the transmission signal generator 1D07 of the wireless device 1D.

The control information CIS1 includes a destination, control signal, transfer necessity, and SN of a control target (an ID of the wireless device 3D, ID of the motor 4D, or the like). The transmission signal generator 1D07 generates the control information CIS1 as upper layer data. The transmission signal generator 1D07 outputs the generated control information CIS1 to the transmitter/receiver 1D01.

FIGS. 23A, 23B, and 23C illustrate conceptual views of another example of data processing performed by the wireless device 1D according to the tenth embodiment. Here, added or changed portions as compared with FIGS. 22A, 22B, and 22C will be mainly described, and functions, items, and the like without any description are changed only in reference numerals and may have the contents similar to those in FIGS. 22A, 22L, and 22C.

FIG. 23A illustrates processing of an upper layer by the transmission signal generator 1D07 of the wireless device 1D. FIG. 23B illustrates processing of a MAC layer by the transmitter/receiver 1D01. FIG. 23C illustrates processing of a physical layer by the transmitter/receiver 1D01.

FIG. 23A illustrates control information CTS21 output by the transmission signal generator 1D07 of the wireless device 1D. The control information CIS21 includes a control signal and SN of a control target.

The control information CIS21 of FIG. 23A does not include the destination of the control target and transfer necessity as compared with the control information of FIG. 22A. The destination of the control target may be included in a MAC layer header and be omitted as information of the upper layer. This is possible since transmission is performed by unicast from the wireless device 1D to the wireless device 3D. The transfer necessity can be omitted if transfer is always necessary. In this case, it is unnecessary to intentionally add information on the transfer necessity. Alternatively, the information on the transfer necessity may be transmitted by transmitting a bit indicating that transfer is unnecessary only when transfer is unnecessary.

FIG. 24 is a functional block diagram illustrating an example of the wireless device 3D according to the tenth embodiment. The wireless device 3D of FIG. 24 further includes a second transmitter/receiver 3D09, source and destination identifying circuit 3D10, transferred signal extraction circuit 3D13, first transferring signal extraction circuit 3D12, and second transferring signal extraction circuit 3D11 as compared with the wireless device 3 of FIG. 8.

The transmitter/receiver 31 of FIG. 8 may be referred to as a first transmitter/receiver 3D01 in FIG. 24, and the first transmitter/receiver 3D01 of FIG. 24 has the same function as the transmitter/receiver of FIG. 8. Here, additional or changed portions as compared with FIG. 8 will be mainly described, only reference numerals are changed regarding functions without any description, and the functions are similar to those in FIG. 8.

The first transmitter/receiver 3D01 receives and demodulates a wireless signal, and outputs a reception signal of which destination included in the MAC layer header coincides with own ID among the demodulated reception signals to an information extraction circuit 3D02. The reception signal that does not coincide with own ID is discarded. The first transmitter/receiver 3D01 adds data to a transmission signal input from a first transmission buffer group 3D08 as necessary for modulation, and transmits the modulated wireless signal. The first transmitter/receiver 3D01 senses a reception signal level of the received wireless signal, outputs the signal level to a carrier sense circuit 3D03, and outputs busy/idle information from the carrier sense circuit 3D03 to a controller 3D04.

The second transmitter/receiver 3D09 receives and demodulates a wireless signal, and outputs the demodulated reception signal to the source and destination identifying circuit 3D10. The wireless signal received by the second transmitter/receiver 3D09 may be, for example, a wireless signal of FIG. 22C, a wireless signal of FIG. 23C, or a wireless signal of FIG. 25C. An antenna receiving the wireless signal may be shared with or separate from the first transmitter/receiver 3D01.

FIGS. 25A, 25B, and 25C illustrate an example of a data format of a transmission signal according to the tenth embodiment. FIG. 25A is an example of data transmitted by unicast from the wireless device 3D having ID "2" to the wireless device 1D.

The data of FIG. 25A is an example including a plurality of control information CIS31 to CIS35. For example, the control information CIS32 includes a destination "1" of the wireless device 3D having ID "1", control signal "1a", and SN "1". The control information CIS33 includes a destination "3" of the wireless device 3D having ID "3", control signal "3a", and SN "1". The control information CIS34 includes a destination of state information, source of the state information, state information "enc3D-1", and SN. The destination is an ID of the wireless device 1D having ID "cnt". The source is an ID of the wireless device 3D having ID "1" that has generated the state information. The control information CIS35 includes a destination "cnt", source "3", state information "enc3D-3", and SN. Descriptions of FIGS. 25B and 25C are the same as the descriptions of FIGS. 14B and 14C, and thus, are omitted here.

Returning to FIG. 24, the source and destination identifying circuit 3D10 receives a reception signal from the second transmitter/receiver 3D09, identifies a transmission source and a destination included in the reception signal, and outputs reception information including the identified transmission source, destination, and the like. The transmission source and the destination may be identified from a transmission source or a destination included in the MAC layer header, or from a transmission source or a destination included in the control information of the upper layer.

The source and destination identifying circuit 3D10 performs the following process according to the identified transmission source and destination.

When the transmission source is the wireless device 1D and the destination is own device (the wireless device 3D), the source and destination identifying circuit 3D10 outputs control information and the like included in the reception signal to the controller 3D04. The same signal is received in the first transmitter/receiver 3D01, and a space diversity effect can be obtained. More specifically, when the wireless device 3D has received control information addressed to own device directly from the wireless device 1D, the source and destination identifying circuit 3D10 nay output the control information included in the reception signal to the controller 3D04.

When the transmission source is the wireless device 1D and the destination is another wireless device 3D, the source and destination identifying circuit 3D10 outputs the reception information to the first transferring signal extraction circuit 3D12 in order to transfer a control signal to the another wireless device 3D. More specifically, when the wireless device 3D has received control information addressed to another device directly from the wireless device 1D, the source and destination identifying circuit 3D10 outputs the control information to the first transferring signal extraction circuit 3D12.

When the transmission-source is another wireless device 3D and the destination included in the control information CIS of the upper layer is the own device (the wireless device 3D), the source and destination identifying circuit 3D10 outputs the reception information to the transferred signal extraction circuit 3D13. More specifically, when a certain wireless device 3D has received the control information CIS addressed to own device from another wireless device 3D, the source and destination identifying circuit 3D10 outputs the reception information to the transferred signal extraction circuit 3D13.

When the transmission source is another wireless device 3D and the destination is the wireless device 1D, the source and destination identifying circuit 3D10 outputs the reception information to the second transferring signal extraction circuit 3D11. More specifically, when a certain wireless device 3D has received the control information CIS addressed to the wireless device 1D from another wireless device 3D, the source and destination identifying circuit 3D10 outputs the reception information to the second transferring signal extraction circuit 3D11.

When the transmission source or the destination is other than the above devices assumed in advance, the source and destination identifying circuit 3D10 discards such a reception signal.

When the wireless device 3D-1 having ID "1" has received a wireless signal including the data of FIG. 25A by the second transmitter/receiver 3D09, the source and destination identifying circuit 3D10 outputs the reception information (the control information CIS32) to the transferred signal extraction circuit 3D13, and outputs the reception information (the control information CIS31) to the second transferring signal extraction circuit 3D11.

The first transferring signal extraction circuit 3D12 receives the reception information from the source and destination identifying circuit 3D10, extracts a destination included in the reception information, control information of the destination, and SN of the control signal, and outputs the extracted information to a first transmission signal generator 3D07.

The second transferring signal extraction circuit 3D11 receives the reception information from the source and destination identifying circuit 3D10, extracts a destination included in the reception information, transmission source, state information of the transmission source, and SN of the control information, and outputs the extracted information to the first transmission signal generator 3D07. For example, when the wireless device 3D-1 having ID "1" has received a wireless signal including the data of FIG. 25A by the second transmitter/receiver 3D09, the second transferring signal extraction circuit 3D11 extracts a destination included in the control information CIS31 of FIG. 25A, a transmission source included in a MAC layer header, state information thereof, and an SN thereof. Alternatively, in addition to the above information, destinations included in the control information sets CIS34 and CIS35, sources thereof, state information thereof, and SNs thereof may be extracted.

The transferred signal extraction circuit 3D13 receives the reception information from the source and destination identifying circuit 3D10, extracts a control signal addressed to own device and included in the reception information, and SN of the control signal, and outputs the extracted information to the controller 3D04. For example, in the case of FIG. 25A, the transferred signal extraction circuit 3D13 of the wireless device 3D-1 extracts a control signal included in the control information CIS32 and SN thereof.

The information extraction circuit 3D02 extracts reception information such as control information and SN, and outputs the reception information to the controller 3D04.

The controller 3D04 receives the reception information from the information extraction circuit 3D02, busy/idle information from the carrier sense circuit 3D03, time information from the timer 3D05, state information from the driver 3D06, control information and SN from the source and destination identifying circuit 3D10, and control information and SN from the transferred signal extraction circuit 3D13.

Figure 26A:
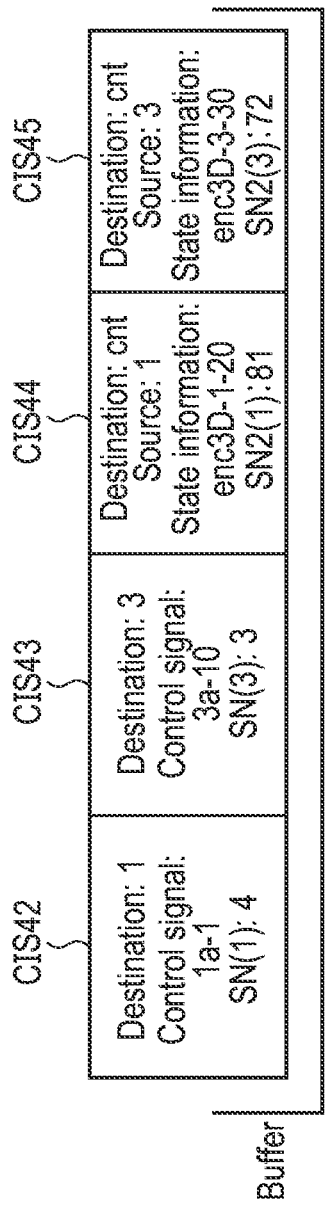
FIGS. 26A, 26B, and 26C illustrate an example of a data processing of the wireless device according to the tenth embodiment.
Figure 26B:
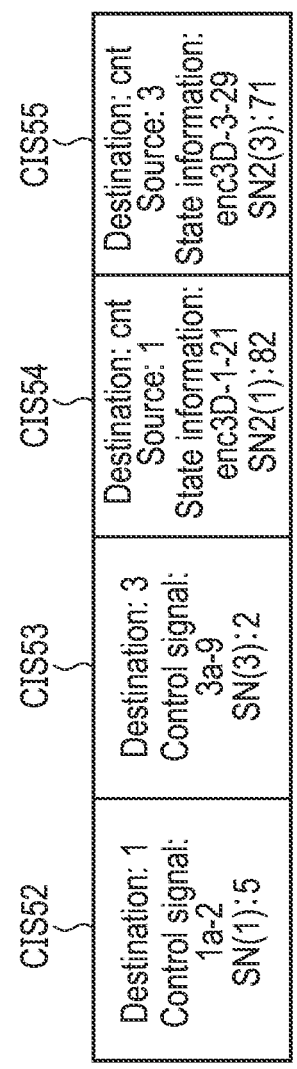
Figure 26C:
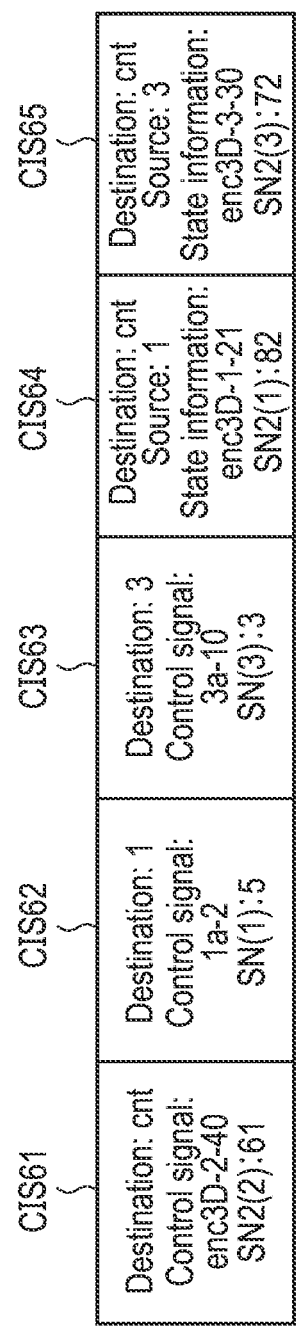

FIGS. 26A, 26B, and 26C are conceptual views of example of data processing of the wireless device 3D according to the tenth embodiment.

FIG. 26A illustrates an example in which the wireless device 3D stores the control information CIS42 to CIS45 in a buffer (not illustrated).

FIG. 26B illustrates an example in which the first transmitter/receiver 3D01, second transmitter/receiver 3D09, and the like newly receive control information CIS52 to CIS55 while the data of FIG. 26A is stored in the buffer of the wireless device 3D.

FIG. 26C illustrates examples of control information CIS61 to CIS65 transmitted by the first transmitter/receiver 3D01 when the wireless device 3D receives the data of FIG. 26B while the data of FIG. 26A is stored in the buffer of the wireless device 3D. The control information CIS61 illustrates an example of a transmission signal for transmitting state information "enc3D-2-40" of the wireless device 3D-2 to the wireless device 1D (destination "cnt"). The control information CIS62 illustrates an example of a transmission signal for transferring control signal "1a-2" for the wireless device 3D-1 to the wireless device 3D-1 (destination "1"). The control information CIS63 illustrates an example of a transmission signal for transferring a control signal "3a-10" for the wireless device 3D-3 to the wireless device 3D-3 (destination "3"). The control information CIS64 illustrates an example of a transmission signal for transferring state information "enc3D-1-21" of the wireless device 3D-1 to the wireless device 1D (destination "cnt"). The control information CIS65 illustrates an example of a transmission signal for transferring state information "enc3D-3-30" of the wireless device 3D-3 to the wireless device 1D (destination "cnt").

An SN illustrated in FIGS. 26A, 26B, and 26C is set for each of the wireless devices 3D, and is illustrated as SN(d). Here, d corresponds to an ID of the wireless device 3D.

The controller 3D04 compares the SN (referred to as $SN_{in}$) received from the information extraction circuit 3D02, source and destination identifying circuit 3D10, and transferred signal extraction circuit 3D13 with the latest SN (referred to as $SN_b$) stored in the buffer (not illustrated), and performs different processes as follows according to a comparison result.

In case of $SN_{in} > SN_b$:

This means that received control information is the latest, and thus, the controller 3D04 outputs a control signal corresponding to the received SN to the driver 3D06 and replaces the latest $SN_b$ stored in the buffer with the received SN ($SN_{in}$).

For example, the wireless device 3D-2 having ID "2" newly receives control information CIS52 addressed to the wireless device 3D-1 having ID "1" while the control information CIS42 addressed to the wireless device 3D-1 having ID "1" is stored in the buffer of the wireless device 3D-2, the controller 3D04 of the wireless device 3D-2 compares the $SN_s$ of the control information CIS42 and CIS52. Since SN(1) of the control information CIS52>SN(1) of the control information CIS42, the controller 3D04 of the wireless device 3D-2 outputs the control signal included in the control information CIS52 to the driver 3D06, and replaces SN(1) (=4) of the control information CIS42 in the buffer with the received SN(1) (=5) of the control information CIS52.

In case of $SN_{in} < SN_b$:

This means that received control information is not the latest, the controller 3D04 discards the received SN and a control signal corresponding to the received SN.

For example, when the wireless device 3D-2 having ID "2" newly receives control information CIS53 addressed to the wireless device 3D-3 having ID "3" while the control information CIS43 addressed to the wireless device 3D-3 in the buffer of the wireless device 3D-2, the controller 3D04 of the wireless device 3D-2 compares SNs of the control information CIS43 and CIS53. Since SN(1) of the control information CIS53<SN(1) of the control information CIS43, the controller 3D04 of the wireless device 3D-2 discards the control signal of the control information CIS53.

In case of $SN_{in} = SN_b$:

This means that received control information is not the latest. The controller 3D04 may perform the same process as that in the case of $SN_{in} > SN_b$, or perform the same process as that in the case of $SN_{in} < SN_b$.

A value of $SN_b$ stored in the buffer of the wireless device 3D may be set to a predetermined minimum value before the wireless device 1D transmits the first control information. For example, when an SN when the wireless device 1D transmits the first control information is set to 1, the wireless device 3D that has received this control information may have 0 as a value of $SN_b$ stored in the buffer. The controller 3D04 outputs the state information request signal to the driver 36 to receive state information periodically or immediately after receiving the latest SN based on the time information. The controller 3D04 outputs the state information and an SN of the state information to the first transmission signal generator 3D07.

The first transmission signal generator 3D07 receives the state information and SN from the controller 3D04, and receives the destination, control signal of the destination, and SN of the control signal from the first transferring signal extraction circuit 3D12 and the second transferring signal extraction circuit 3D11.

The first transmission signal generator 3D07 compares the SN (referred to as $SN(d)_{in}$) for each destination (referred to as d) received from the first transferring signal extraction circuit 3D12 and the second transferring signal extraction circuit 3D11 with the latest SN (referred to as $SN(d)_b$) for each destination (c) stored in the buffer, and performs different processes as follows according to a comparison result.

In case of $SN(d)_{in} > SN(d)_b$:

This means that received control information is the latest, the first transmission signal generator 3D07 replaces the latest SN (that is, $SN(d)_b$) stored in the buffer with the received SN (that is, $SN(d)_{in}$), and sets the SN, control information corresponding to the SN, and a destination corresponding to the SN as a candidate for a transmission signal.

For example, when the wireless device 3D-2 having ID "2" newly receives control information CIS52 addressed to the wireless device 3D-1 while the control information CIS42 addressed to the wireless device 3D-1 is stored in the buffer of the wireless device 3D-2, the first transmission signal generator 3D07 of the wireless device 3D-2 compares the SNs of the control information CIS42 and CIS52. Since SN(1) of the control information CIS52>SN(1) of the control information CIS42, the first transmission signal generator 3D07 of the wireless device 3D-2 replaces SN(1) (=4) of the control information CIS42 in the buffer with the received SN(1) (=5 ) of the control information CIS52. Furthermore, the first transmission signal generator 3D07 sets the control information CIS52 as a candidate for a transmission signal as illustrated in the control information CIS62 of FIG. 26C. The transmission signal may be transmitted from the first transmitter/receiver 3D01 of the wireless device 3D-2 and transferred to the wireless device 3D-1.

In case of $SN(d)_{in} < SN(d)_b$:

This means that received control information is not the latest, the received SN, control signal corresponding to the received SN, and destination corresponding to the received SN are discarded.

For example, when the wireless device 3D-2 newly received the control information CIS53 addressed to the wireless device 3D-3 while the control information CIS43 addressed to the wireless device 3D-3 is stored in the buffer, the first transmission signal generator 3D07 of the wireless device 3D-2 compares the SNs of the control information CIS43 and CIS53. Since SN(1) of the control information CIS53<SN(1) of the control information CIS43, the first transmission signal generator 3D07 of the wireless device 3D-2 discards the control signal of the control information CIS53. That is, the first transmission signal generator 3D07 of the wireless device 3D-2 does not include information for the wireless device 3D-3 in the transmission signal as illustrated in FIG. 26C.

In case of $SN(d)_{in} = SN(d)_b$:

This means that received control information is not the latest. The same process as that in the case of $SN(d)_{in}' > SN(d)_b$ may be performed, or the same process as that in the case of $SN(d)_{in} < SN(d)_b$ may be performed.

The first transmission signal generator 3D07 generates a first transmission signal from the state information and the SN thereof received from the controller 3D04, and the SN, control information corresponding to the SN, and destination corresponding to the SN set as a candidate of the transmission signal, and outputs the first transmission signal to the first transmission buffer group 3D08. If the SN and control information corresponding to the SN set as the candidate are not present, the first transmission signal generator 3D07 may not include the SN and control information corresponding to the SN in the transmission signal. If a plurality of SNs for a plurality of destinations, control information corresponding to the SNs, and destinations corresponding to the SNs are present, the first transmission signal generator 3D07 may include all of the SNs, control information, and destinations in the transmission signal.

The above processing conditions may be applied to the state information transmitted by each of the wireless devices 3D. For example, the control information CIS44 and CIS45 of FIG. 26A are examples in which the wireless devices 3D-1 and 3D-3 transmit the state information and the wireless device 3D-2 receives the state information and stores the received state information in the buffer (not illustrated). Here, SN2(*d*) may indicate a sequence number for the state information of the wireless device 3D having ID "d". It is assumed that the wireless devices 3D-2 has newly received the control information CIS54 and CIS55 of FIG. 26B. The first transmission signal generator 3D07 of the wireless device 3D-2 compares the sequence numbers SN2 of the control information CIS54 and CIS55. The first transmission signal generator 3D07 may set the control information CIS54 to the control information CIS64 and select the control information CIS64 as a candidate of a transmission signal as illustrated in FIG. 26C based on the above conditions for the control information. The first transmission signal generator 3D07 may set the control information CIS45 to the control information CIS65 and select the control information CIS65 as a candidate of a transmission signal as illustrated in FIG. 26C based on the above conditions for the control information. The first transmitter/receiver 3D01 transfers the transmission signal to the wireless device 1D.

According to the present embodiment, even when the wireless device 1 transmits the control signal to each wireless device 3 by unicast, each wireless device 3 can transfer the control signal to another wireless device 3. When each wireless device 3 transmits state information to the wireless device 1, it is possible to transfer state information of own device and another wireless device 3. Furthermore, the wireless device 1 and each wireless device 3 perform transmission including the SN and perform the above-described processes based on the received SN. Therefore, it is possible to perform transfer to the wireless device 1 or each wireless device 3 by a timing when the transfer is necessary. It is possible to perform desired control for each control target. There is no need for transmission of an unnecessary wireless signal.

The tenth embodiment is summarized as follows.

(A-1) The wireless device 1D generates and transmits a control signal for each motor 4, and the wireless device 3D receives control information addressed to own device and controls a control target.

(A-2) The wireless device 3D receives a signal transmitted from the other wireless device 3D to the wireless device 1D, acquires control information of own device from the reception signal, and control a control target.

(A-3) The wireless device 3D receives a signal transmitted from the other wireless device 3D to the wireless device 1D, acquires state information addressed to the wireless device 1D from the reception signal, and transmits the acquired state information and state information of own device to the wireless device 1D.

(A-4) The wireless device 3D receives a signal transmitted from the wireless device 1D to the other wireless device 3D, acquires control information from the reception signal, and transmits the acquired control information and state information of own device to the wireless device 1D.

Through the above procedure, it is possible to perform transfer even when the wireless device receives the control information or state information addressed to other than itself. The above examples are not intended to be limited thereto, and various examples may be assumed, and any method such as replacement or combination of the above examples may be adopted.

According to at least one embodiment, there is provided a wireless device as a controller, a wireless device as a controlled target, a control system, a control method, and a storage medium which performs an efficient control.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The drawings are sometimes schematically represented in terms of the width, thickness, shape, and the like of each unit as compared with actual aspects in order to clarify the description. In the block diagrams, data and signals are sometimes transmitted and received between blocks that are not connected or in a direction that is not indicated by an arrow between connected blocks. The processes illustrated in the flowcharts, sequence charts, and the like may be implemented by hardware such as an IC chip and a digital signal processor (DSP), by software (a program or the like) operated by a computer including a microcomputer, or by a combination of the hardware and the software. The device of the present invention is applied even of the claim is expressed as control logic, as a program including instructions for executing a computer, and as a computer readable recording medium describing the instructions, the present invention is not limited to names and terms thus used, but includes other expressions as long as the expressions have substantially the same content and the same purpose.

What is claimed is:

1. A wireless device comprising:
    circuitry configured to:
       generate control signals for respective control targets;
       generate transfer necessity signals, one of the transfer necessity signals for one of the control targets indicating whether transfer of the one of the control signals for the one of the control targets from another of the control targets to the one of the control targets is necessary or unnecessary;
       generate control information including the control signals and the transfer necessity signals;
       transmit a wireless signal corresponding to the control information; and
       receive a wireless signal including control periods of the respective control targets,
    wherein the one of the transfer necessity signals for the one of the control targets indicates that transfer of the one of the control signals for the one of the control targets from the another of the control targets to the one of the control targets is necessary when the control period of the one of the control targets is shorter than a threshold.

2. The wireless device according to claim 1, wherein:
    the circuitry is configured to generate respective transfer deadlines of the control signals; and the control information further includes the transfer deadlines.

3. The wireless device according to claim 2, wherein the circuitry is configured to:
   measure a ratio of a busy time of the wireless device and an idle time of the wireless device; and
   generate one of the transfer deadlines based on the ratio and a number of one of the control targets to which the control information needs to be transferred.

4. The wireless device according to claim 2, wherein the circuitry is configured to:
   extract state information indicating states of the control targets from a received wireless signal;
   generate the control signals based on the state information; and
   generate the transfer necessity signals based on the state information.

5. The wireless device according to claim 3, wherein:
   the circuitry is configured to generate identification information identifying the one of the control targets; and
   the control information further includes the identification information.

6. The wireless device according to claim 3, wherein the circuitry is configured to:
   extract state information indicating states of the control targets from a received wireless signal; and
   generate the transfer necessity signals based on respective control target values for the control targets and the state information.

7. The wireless device according to claim 1, wherein the circuitry is configured to:
   generate plural items of the control information as upper layer data;
   add a header of a lower layer to the plural items of the control information; and
   transmit the wireless signal corresponding to the header and the plural items of the control information by multicast or broadcast.

8. A wireless device comprising:
   a first control target; and
   circuitry configured to:
   receive a first wireless signal including a first control signal for the first control target, a second control signal for a second control target, and transfer necessity signals;
   control the first control target based on the first control signal; and
   transfer a second wireless signal including the second control signal based on the transfer necessity signals,
   wherein:
   the first wireless signal further includes a transfer deadline,
   the circuitry is configured to transfer the second control signal based on the transfer deadline, and
   the circuitry is configured to:
      receive information from the first control target;
      generate a first transmission signal including state information;
      generate a second transmission signal including the state information and the second control signal; and
      transmit the first transmission signal or the second transmission signal as the second wireless signal based on whether the transfer deadline has passed.

9. A control system comprising:
   a first wireless device; and
   a second wireless device connected to a first control target,
   wherein:
   the first wireless device comprises circuitry configured to:
      generate control signals for respective control targets;
      generate transfer necessity signals, one of the transfer necessity signals for one of the control targets indicating whether transfer of the one of the control signals for the one of the control targets from another of the control targets to the one of the control targets is necessary or unnecessary;
      generate control information including the control signals and the transfer necessity signals; and
      transmit a wireless signal corresponding to the control information, and the second wireless device comprises circuitry configured to:
      receive a first wireless signal including a first control signal for the first control target, a second control signal for a second control target, and the transfer necessity signals;
      control the first control target based on the first control signal; and
      transfer a second wireless signal including the second control signal based on the transfer necessity signals.

10. A wireless transmission method comprising:
   generating control signals for respective control targets;
   generating transfer necessity signals, one of the transfer necessity signals for one of the control targets indicating whether transfer of the one of the control signals for the one of the control targets from another of the control targets to the one of the control targets is necessary or unnecessary;
   generating control information including the control signals and the transfer necessity signals;
   transmitting a wireless signal corresponding to the control information; and
   receiving a wireless signal including control periods of the respective control targets,
   wherein the one of the transfer necessity signals for the one of the control targets indicates that transfer of the one of the control signals for the one of the control targets from the another of the control targets to the one of the control targets is necessary when the control period of the one of the control targets is shorter than a threshold.

11. A non-transitory computer-readable storage medium storing computer-executable instructions that, when executed by a computer, cause the computer to control functions comprising:
   generating control signals for respective control targets;
   generating transfer necessity signals, one of the transfer necessity signals for one of the control targets indicating whether transfer of the one of the control signals for the one of the control targets from another of the control targets to the one of the control targets is necessary or unnecessary;
   generating control information including the control signals and the transfer necessity signals;
   transmitting a wireless signal corresponding to the control information; and
   receiving a wireless signal including control periods of the respective control targets,
   wherein the one of the transfer necessity signals for the one of the control targets indicates that transfer of the one of the control signals for the one of the control targets from the another of the control targets to the one of the control targets is necessary when the control period of the one of the control targets is shorter than a threshold.

12. A wireless device comprising:
circuitry configured to:
- generate control signals for respective control targets including motors;
- generate transfer necessity signals, one of the transfer necessity signals for one of the control targets indicating whether transfer of the one of the control signals for the one of the control targets from another of the control targets to the one of the control targets is necessary or unnecessary;
- generate control information including the control signals and the transfer necessity signals;
- transmit a wireless signal corresponding to the control information; and
- receive a wireless signal including detection values of rotation speeds of the motors of the control targets, wherein the one of the transfer necessity signals for the one of the control targets indicates that transfer of the one of the control signals for the one of the control targets from the another of the control targets to the one of the control targets is necessary when a difference between a target value and the detection value of the rotation speed of the one of the control targets is maximum among the detection values of the rotation speeds of the motors of the control targets.

13. A wireless device comprising:
circuitry configured to:
- generate control signals for respective control targets including motors;
- generate transfer necessity signals, one of the transfer necessity signals for one of the control targets indicating whether transfer of the one of the control signals for the one of the control targets from another of the control targets to the one of the control targets is necessary or unnecessary;
- generate control information including the control signals and the transfer necessity signals;
- transmit a wireless signal corresponding to the control information; and
- receive a wireless signal including detection values of rotation speeds of the motors of the control targets, wherein the one of the transfer necessity signals for the one of the control targets indicates that transfer of the one of the control signals for the one of the control targets from the another of the control targets to the one of the control targets is necessary when a difference between a target value and the detection value of the rotation speed of the one of the control targets is greater than a threshold.

14. A wireless device comprising:
circuitry configured to:
- generate control signals for respective control targets including motors;
- generate transfer necessity signals, one of the transfer necessity signals for one of the control targets indicating whether transfer of the one of the control signals for the one of the control targets from another of the control targets to the one of the control targets is necessary or unnecessary;
- generate control information including the control signals and the transfer necessity signals;
- transmit a wireless signal corresponding to the control information;
- receive a wireless signal including detection values of rotation speeds of the motors of the control targets; and
- calculate accelerations of the motors based on the detection values, wherein the one of the transfer necessity signals for the one of the control targets indicates that transfer of the one of the control signals for the one of the control targets from the another of the control targets to the one of the control targets is necessary when the calculated acceleration of the one of the control targets is greater than a threshold.

15. A wireless device comprising:
circuitry configured to:
- generate control signals for respective control targets including motors;
- generate transfer necessity signals, one of the transfer necessity signals for one of the control targets indicating whether transfer of the one of the control signals for the one of the control targets from another of the control targets to the one of the control targets is necessary or unnecessary;
- generate control information including the control signals and the transfer necessity signals;
- transmit a wireless signal corresponding to the control information; and
- receive wireless signals from the control targets, wherein the one of the transfer necessity signals for the one of the control targets indicates that transfer of the one of the control signals for the one of the control targets from the another of the control targets to the one of the control targets is necessary when a reception power of the wireless signal from the one of the control targets is lowest among the wireless signals from the control targets.

16. A wireless device comprising:
circuitry configured to:
- generate control signals for respective control targets including motors;
- generate transfer necessity signals, one of the transfer necessity signals for one of the control targets indicating whether transfer of the one of the control signals for the one of the control targets from another of the control targets to the one of the control targets is necessary or unnecessary;
- generate control information including the control signals and the transfer necessity signals;
- transmit a wireless signal corresponding to the control information; and
- receive wireless signals from the control targets, wherein the one of the transfer necessity signals for the one of the control targets indicates that transfer of the one of the control signals for the one of the control targets from the another of the control targets to the one of the control targets is necessary when a reception time interval of the wireless signal from the one of the control targets is longest among reception time intervals of the wireless signals from the control targets.

17. A wireless device comprising:
circuitry configured to:
- generate control signals for respective control targets including motors;
- generate transfer necessity signals, one of the transfer necessity signals for one of the control targets indicating whether transfer of the one of the control signals for the one of the control targets from another of the control targets to the one of the control targets is necessary or unnecessary;
- generate control information including the control signals and the transfer necessity signals;

transmit a wireless signal corresponding to the control information; and receive a wireless signal including request reliabilities of the control targets, wherein the one of the transfer necessity signals for the one of the control targets indicates that transfer of the one of the control signals for the one of the control targets from the another of the control targets to the one of the control targets is necessary when the request reliability of the one of the control targets is highest among the request reliabilities of the control targets.

18. A wireless device comprising:

circuitry configured to:

generate control signals for respective control targets including motors;

generate transfer necessity signals, one of the transfer necessity signals for one of the control targets indicating whether transfer of the one of the control signals for the one of the control targets from another of the control targets to the one of the control targets is necessary or unnecessary;

generate control information including the control signals and the transfer necessity signals; and transmit a wireless signal corresponding to the control information, wherein the transfer necessity signals for all of the control targets indicate that transfer of the control signals is necessary when the circuitry receives an emergency stop message.

* * * * *